US012286273B1

(12) United States Patent
Sherman

(10) Patent No.: US 12,286,273 B1
(45) Date of Patent: Apr. 29, 2025

(54) FALL LEAF MAINTENANCE APPARATUS AND METHOD

(71) Applicant: Irvin Gaines Sherman, Harrisburg, NC (US)

(72) Inventor: Irvin Gaines Sherman, Harrisburg, NC (US)

(*) Notice: Subject to any disclaimer, the term of this patent is extended or adjusted under 35 U.S.C. 154(b) by 76 days.

(21) Appl. No.: 18/299,203

(22) Filed: Apr. 12, 2023

(51) Int. Cl.
*B65D 25/28* (2006.01)
*A01G 20/47* (2018.01)
*B65D 43/16* (2006.01)
*B65D 43/22* (2006.01)

(52) U.S. Cl.
CPC ......... *B65D 25/2826* (2013.01); *A01G 20/47* (2018.02); *B65D 43/167* (2013.01); *B65D 43/22* (2013.01); *B65D 2251/1058* (2013.01); *B65D 2543/00203* (2013.01)

(58) Field of Classification Search
CPC ...... B65B 67/04; B65B 67/1205; A01G 20/00
See application file for complete search history.

(56) References Cited

U.S. PATENT DOCUMENTS

| | | | |
|---|---|---|---|
| 3,040,925 A * | 6/1962 | Mills | B65D 88/528 206/521 |
| 4,561,480 A | 12/1985 | Underwood | |
| 4,713,858 A | 12/1987 | Kelber | |
| 5,031,277 A * | 7/1991 | Coker | B65F 1/1468 15/257.3 |
| 5,451,107 A | 9/1995 | Ricker | |
| 5,878,461 A | 3/1999 | Killian | |
| 6,089,006 A | 7/2000 | Langford | |
| 7,520,546 B2 | 4/2009 | Monahan | |
| 7,815,153 B2 * | 10/2010 | Campbell | B65F 1/1415 248/95 |
| 10,793,351 B2 | 10/2020 | Watje et al. | |
| 11,229,159 B1 | 1/2022 | Feldman | |
| 2004/0061372 A1 | 4/2004 | Messinger-Rapport | |
| 2006/0021311 A1 | 2/2006 | Kim | |
| 2007/0095419 A1 | 5/2007 | Campbell | |
| 2007/0138453 A1 | 6/2007 | Le | |

(Continued)

OTHER PUBLICATIONS

Tanisha Fletcher, 4 leaf blowing techniques you should try this fall, Oct. 27, 2022, https://www.toptenreviews.com/leaf-blowing-techniques, tip #2.

(Continued)

*Primary Examiner* — Timothy L Maust

(57) ABSTRACT

A simple, easy to use, lightweight apparatus to be used with a leaf blower to collect yard debris, such as leaves, acorns and sticks. It provides a large opening (114) to receive debris straight into the cavity of the apparatus. The cavity holds a large volume of debris and once the debris has been collected, it is protected from being scattered by the wind or spilling out when being transported. One embodiment provides two fixed wheels (1200) which allow the apparatus be tilted and rolled rather than lifted or dragged. Another embodiment provides two fixed wheels (1200) and two swivel wheels (1700) so the worker merely pushes the apparatus. During unloading the worker never bears the entire weight of the loaded apparatus, but merely lifts the empty apparatus off the pile of debris. Another embodiment provides a ramp (1010) that helps to prevent blown debris from resettling into the grass.

17 Claims, 27 Drawing Sheets

(56) References Cited

U.S. PATENT DOCUMENTS

| | | |
|---|---|---|
| 2008/0052869 A1* | 3/2008 | Fanning ................. A01G 20/47 |
| | | 15/257.1 |
| 2008/0110912 A1 | 5/2008 | Kordecki |
| 2009/0272087 A1 | 11/2009 | Shirasawa |
| 2009/0314321 A1 | 12/2009 | Van Dyken |
| 2013/0135658 A1 | 5/2013 | Kogure |
| 2013/0195383 A1 | 8/2013 | Daugs, Jr. |
| 2014/0252002 A1 | 9/2014 | Donoghue |
| 2015/0237800 A1 | 8/2015 | DeHart |
| 2015/0251848 A1 | 9/2015 | Sanders |
| 2015/0360861 A1 | 12/2015 | Vicent |
| 2016/0120120 A1 | 5/2016 | Kovacs |
| 2017/0188516 A1 | 7/2017 | Laflin |
| 2018/0009559 A1 | 1/2018 | Richison |
| 2018/0092498 A1 | 4/2018 | Mata |
| 2018/0128405 A1 | 5/2018 | Clason et al. |
| 2019/0144203 A1 | 5/2019 | Ventures |
| 2020/0291602 A1* | 9/2020 | Peterson ................. E01H 15/00 |
| 2022/0053696 A1 | 2/2022 | Jones |
| 2022/0348404 A1 | 11/2022 | Granitz, III |

OTHER PUBLICATIONS

Bob Vila, How to: Use a Leaf Blower, https://www.bobvila.com/articles/how-to-use-a-leaf-blower/, Section: Develop a smart strategy for using a leaf blower.

The Home Depot, How to Use a Leaf Blower, https://www.homedepot.com/c/ah/how-to-use-a-leaf-blower/9ba683603be9fa5395fab901e074470a, Section: #3—Work Your Leaf Blower Plan; Section #5 Managing Your Piles of Leaves.

* cited by examiner

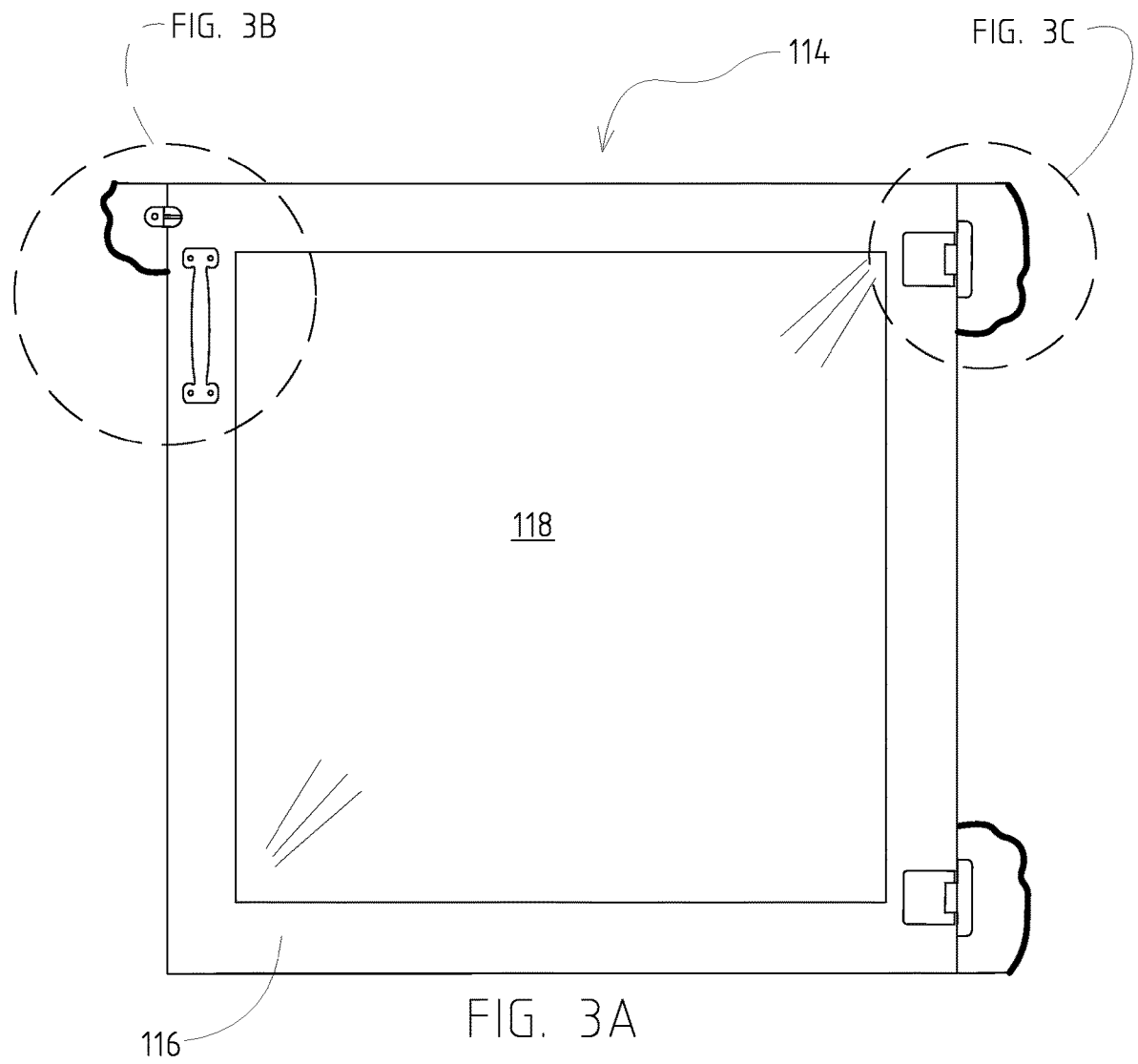
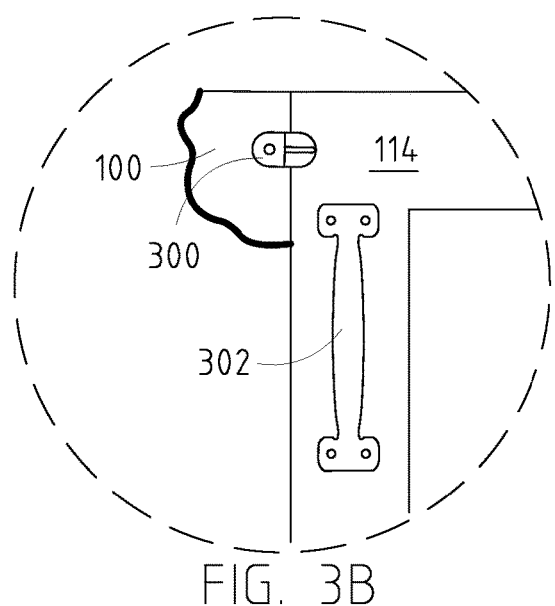
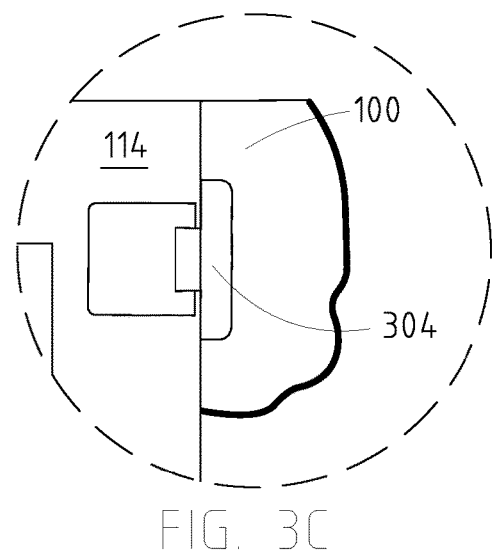
FIG. 3A
FIG. 3B
FIG. 3C

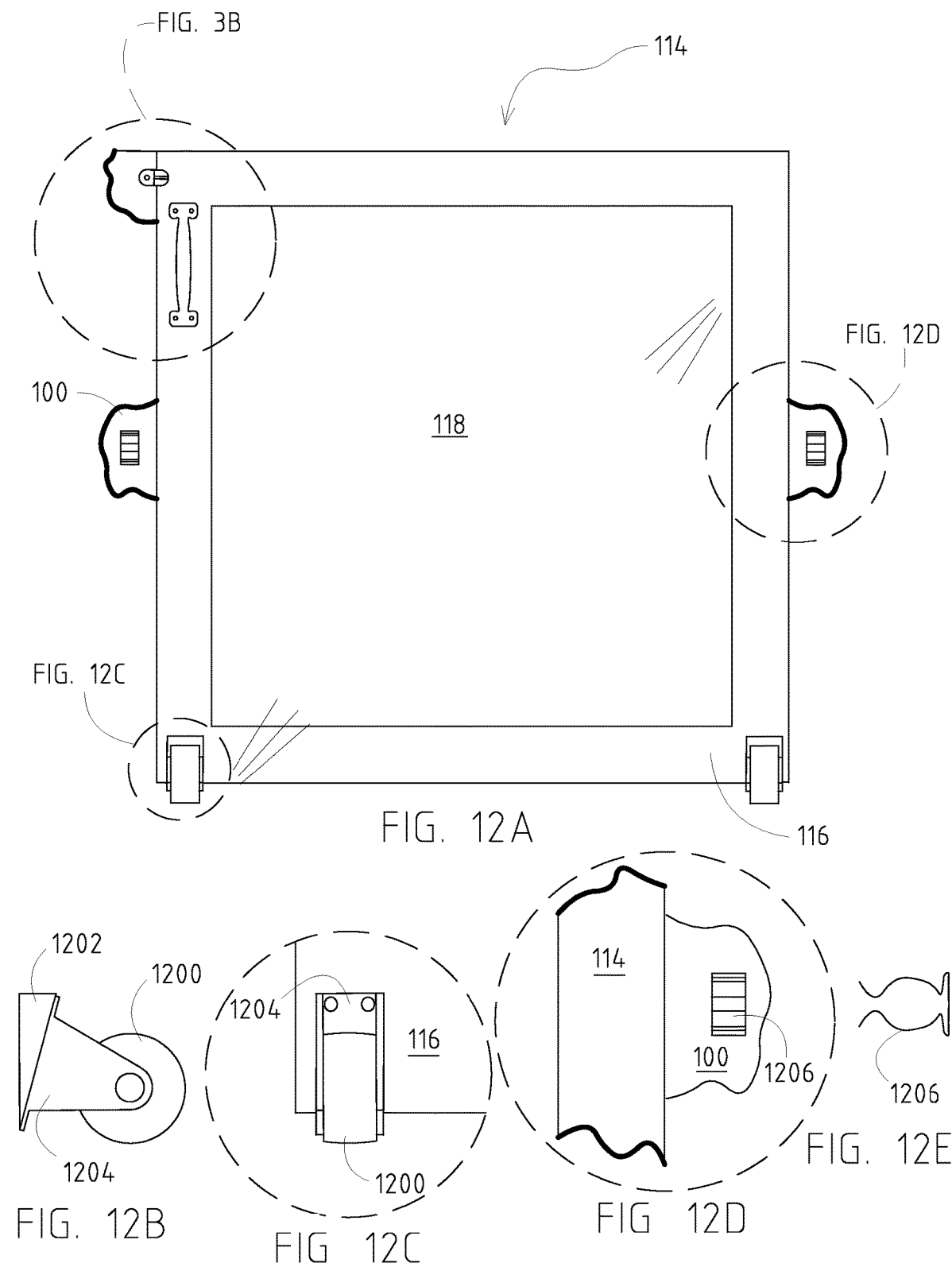

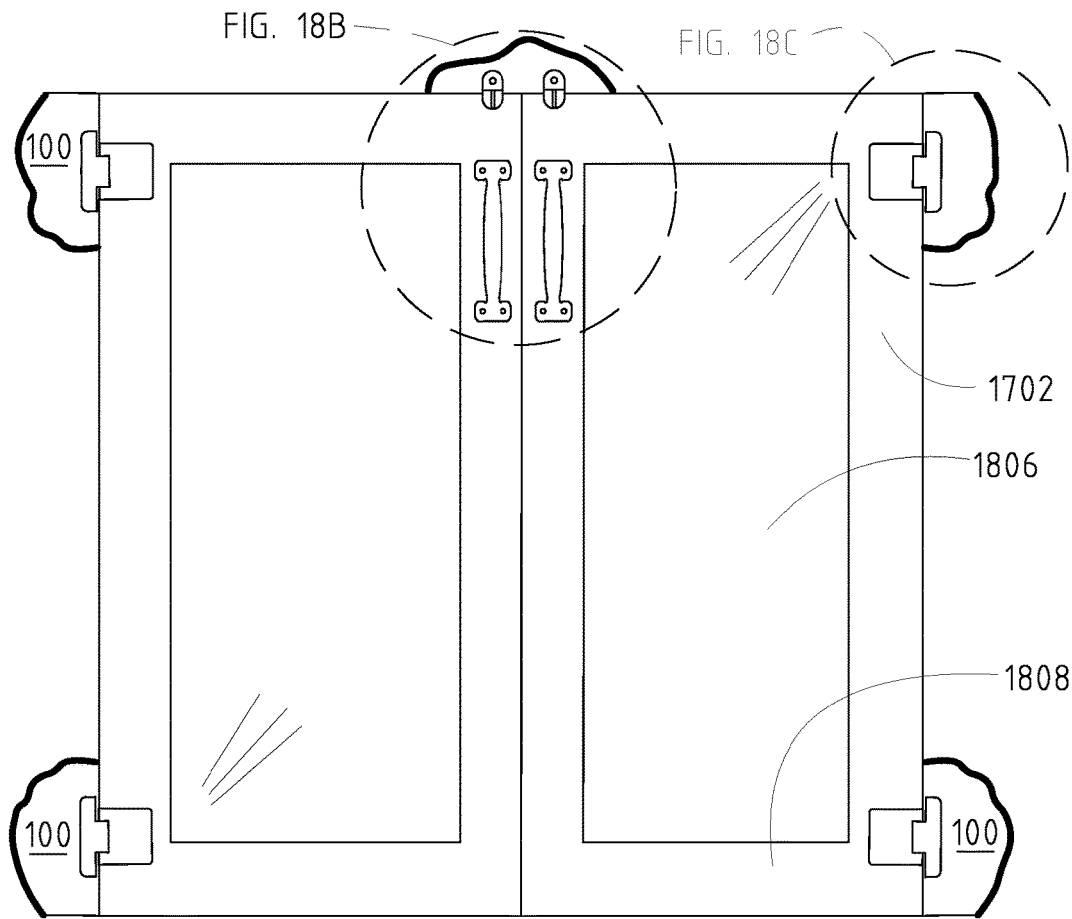
FIG. 18A
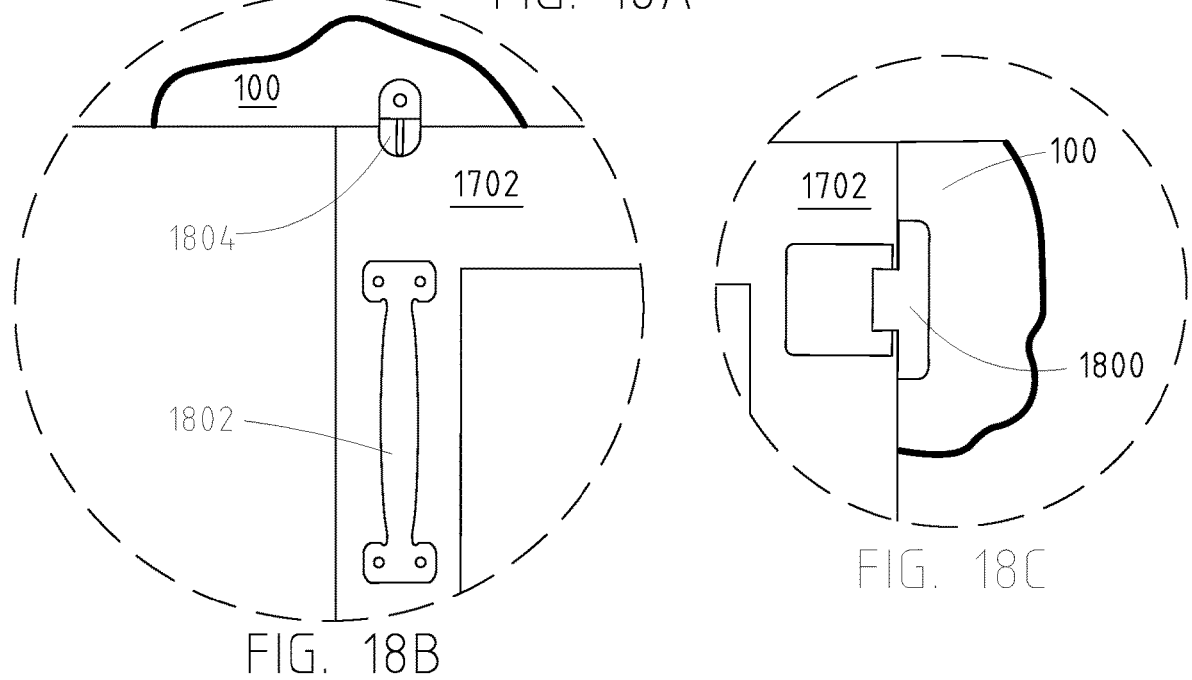
FIG. 18B
FIG. 18C

FALL LEAF MAINTENANCE APPARATUS AND METHOD

PRIOR ART

Fall leaf maintenance usually has three steps—gathering, collecting and disposing of the leaves. Gathering is defined as bringing the leaves together, such as in a pile. Collecting is defined as picking the leaves up and disposing is defined as getting rid of leaves. The disposal may be into refuse containers, a pile near the street for the local municipality to pick up, a compost pile, etc. The maintenance steps hold true whether leaves are raked, blown, vacuumed or bagged with a power mower. This document focuses mostly on the blowing of leaves because this seems the method most often used for large leaf collections. In spite of the manual labor involved, blowing leaves also appears to be the best method for thorough leaf collection.

Workers start out by blowing leaves into what starts out as a small mound. After further gathering the mound grows into a pile, which soon gets in the way of new gathering. To make way, the pile is then blown into areas yet to be collected and the pile grows ever larger. It would be simple and efficient to stop, collect and dispose of the small mound of leaves. However workers so dislike the bending, stooping, lifting and carrying of leaves, they are content to move the collected leaves along as they gather more and more leaves. Some workers blow the gathered leaves all the way to their destination, skipping collection altogether. Workers who skip collection gather leaves only to redistribute them forward over and over again. Others take a more measured approach and stop gathering periodically to collect and dispose of the leaves.

I feel today's workers would be open to change their current method of leaf maintenance if there were an available solution that addresses: saving time; reducing physical demands; minimizing lawn damage; and providing true value. The following evaluation is based on how well the improvements offered by the prior art addresses these goals. It is also based on the assumption that a worker uses a leaf blower and handles one or more cubic yards of leaves during an outing.

Improvements in the field have seemed to focus on assisting the worker who stops gathering and collects periodically. An age-old method has been to blow or rake gathered leaves onto a plain tarp then carry or drag the tarp for disposal. Improvements in one category seek to make the plain tarp easier to use and less cumbersome. Improvements in a second category seek to address bagging leaves and disposing of the bags. Improvements in a third category seek to replace the conventional process with a revised process based on a new device or apparatus. Representative art in each category is discussed below.

In the first category, tarp improvements U. S. Pat. Application No. 2006/0021311, Biodegradable Leaf Collection Net, inventor Kim discloses a large flat net placed on the ground with a vertical net providing a backstop to prevent the worker from blowing leaves off the large flat net and also to protect collected leaves from wind gusts. Kim teaches that multiple strands are pulled to cause the large flat net to be formed into essentially a bag. Kim also describes one embodiment that covers a 10'×10' area which holds roughly half of a cubic yard of leaves. These aspects appear to save time by resulting in fewer trips for leaf disposal but, they come with additional tasks. New tasks include the insertion and removal of tent pegs and poles for each collection area. Also to form the bag the worker must pull multiple cord loops over forty linear feet to close the bag. No relief is provided to transport the bags. During the leaf maintenance task the worker must keep up with multiple tent pegs and poles. And since the bags are single-use, the worker must maintain an ample supply.

Also in the tarp improvement category U.S. Pat. No. 7,520,546, Leaf and Debris Cleanup Apparatus, inventor Monahan teaches the use of a tarp with vertical walls on three sides and handles to assist in lifting or dragging the apparatus for leaf disposal. The walls provide partial protection against wind and the handles allow the apparatus to be easily gripped for handling. But like Kim's Biodegradable Leaf Collection Net, each collection location requires set-up and take-down tasks of inserting and removing anchors to keep the collection surface in place. Besides the handles no other help is provided for the worker who has to carry or drag the loaded apparatus for disposal.

In the second category addressing the filling of bags U. S. Pat. Application No. 2014/0252002, Waste Removal System, inventor Donoghue et al. teaches the use of a frame containing multiple flat sheets on which leaves are placed. These sheets are then folded or drawn up with a string into a bag for disposal. The worker sweeps or rakes leaves onto the sheets. No walls are provided for protection from wind or raking leaves over the sides of the sheet. Also no help is provided for the worker to carry or drag the loaded bag. Workers have the additional tasks of loading the frame with sheets and keeping an ample supply of flat sheets on hand.

Also in the bag filling category area U. S. Pat. Application No. 2018/0009559, Yard Waste Collection Device, inventor Richison discloses an integral body which attaches to a bag. Similar to the Waste Removal System, leaves are raked or swept onto a collection surface. Moving debris to the rear of the bag for complete filling is accomplished by lifting the attached handle. If the bag is to be emptied for disposal, Donoghue et al. teach carrying or dragging the loaded bag and the device, then using the attached handle to empty the bag.

In the third category, revised processes U. S. Pat. Application No. 2007/0095419, Leaf Catcher, inventor Campbell et al. disclose a mesh bag, a ramp with an intake area that when used with a leaf blower, creates air currents to ensure optimal bag filling. Once the collected leaves are blown into the mesh bag they are protected from being re-scattered. Also like some previously mentioned art, there is a set-up required for each collection area. After collection no relief is provided to the worker to lift or drag the mesh bag for disposal.

Also in the revised process area U. S. Pat. Application No. 2009/0272087, Yard Debris Catcher, inventor Shirasawa discloses an apparatus with a handle, wheels and a perforate container to hold debris. These aspects have the potential to make the worker's task less burdensome, however, they are not used as effectively as they could be. The container size is small in comparison to previously mentioned art. Also Shirasawa limits the output of a leaf blower to fill the container in a controlled manner. Due to its small container and blower output limitation, it appears that the Yard Debris Catcher is only suitable for collection of small amounts of leaves and not suitable to handle a cubic yard or more of leaves. Shirasawa seems to substantiate this view by the statement: "The objective and advantage of the invention is that it reduces additional time and effort spent on going back and collecting yard debris after trimming or cutting grass, shrubs, plants, or trees." Leaf collection is only mentioned once in the teaching, which leads me to believe the Yard Debris Catcher's leaf collection is only associated with incidental leaves falling as a result of trimming or cutting and not as a solution for fall leaf maintenance.

While there have been improvements for fall leaf maintenance, they have been incremental. Due to the seasonal nature of this task, I feel workers are looking for a solution that is simple to learn, easy to use and has the potential to be worth the effort of changing their current way of handling the task. In summary I feel the current offerings do not meet these expectations because they fall short in one or more of the following:
1. time spent on fall leaf maintenance has not been materially reduced
2. bending, stooping, lifting and carrying have not been not minimized to an acceptable level
3. set-up, tear-down and/or transporting for disposal results in unacceptable lawn damage
4. the worker's investment in terms of time, money and maintenance is too great

BACKGROUND OF THE INVENTION

The present invention relates to collecting, gathering or loading mown material, and more particularly to the gathering and collection of yard debris by workers using gas or electric powered leaf blowers and/or vacuums/shredders.

SUMMARY OF THE INVENTION

Summary of the Embodiments

Embodiment #1

The first embodiment of the apparatus comprises a open frame, with covering on all sides except one. The side left uncovered is the front of the apparatus; the front frame opening is a large square and provides mounting for a hinged large door. The rear frame opening is a smaller square. The left and right side frame openings are trapezoidal-shaped. The base and top frame openings are isosceles trapezoidal-shaped. The cavity inside the covered frame is loaded and unloaded via a large door. The covering of the top frame opening is a perforate material; the large door is also covered with a perforate material.

Embodiment #2

The second embodiment comprises the first embodiment plus two fixed wheels are mounted to the large door to assist in transporting the apparatus. A small door on the rear is added as another means of loading and unloading the cavity. There is a ramp attached to the base covering and this ramp extends through the large door opening and rests on the collection surface.

Embodiment #3

The third embodiment adds two swivel wheels to the base and moves the two fixed wheels in the second embodiment to the base. The large door introduced in the first embodiment is replaced by twin doors.

Embodiments #4 and #5

The fourth embodiment provides a removable covering for the top of the frame and the fifth embodiment provides a one-piece removable full cover which covers the top, the right side and the left side of the frame.

Description of the Embodiments

In one embodiment the apparatus comprises a closed rigid container where at least the top is made of perforate material and there is at least one large door also covered with perforate material. The large door provides access to the cavity of the container. One or more aspects of this embodiment allow a worker using a leaf blower to blow leaves and debris into the cavity where the debris and leaves are retained in the cavity as the air carrying the leaves and debris escapes through the top perforate material.

Another embodiment provides a ramp that extends out of the large door opening and rests on the collection surface. One or more aspects of this embodiment facilitates collection by allowing the airborne leaves and debris to settle on the ramp rather than settling back onto or into the collection surface.

Another embodiment provides two fixed wheels. One or more aspects of this embodiment eases the physical effort required of a worker to transport the apparatus by allowing it to be tilted and rolled rather than carried or dragged.

Another embodiment provides four wheels, two of which swivel. One or more aspects of this embodiment relieves the worker from supporting any weight of the loaded apparatus during transport and provides the ability to steer the apparatus in the direction desired.

Another embodiment replaces the large door with twin doors. One or more aspects of this embodiment allows the apparatus to be used in smaller spaces and allows efficient collection equally on both side of the apparatus.

Another embodiment provides a removable top. One or more aspects of this embodiment allows the apparatus to be loaded from above.

Another embodiment provides a removable one-piece top and sides combination. One or more aspects of this embodiment allows replacement of these elements due to damage or wear.

One or more embodiments relate to a first method of using the apparatus for the collection of leaves and debris. Providing a rigid container having a vertically hinged door that swings outward, and having the door swung open to various angles, the door along with its inside bottom panel are used as both a backstop and a guide to position leaves so they can be more easily directed into the cavity of the apparatus.

One or more embodiments relate to a second method of using the apparatus for the collection of leaves and debris. Providing a rigid container that has a volume less than the volume of leaves and debris to be collected, a worker gathers only enough leaves and debris to fill the container. The worker refrains from gathering more and refrains from blowing the gathered leaves into other areas where gathering has not yet occurred. The gathered leaves are collected and the apparatus is moved to a disposal location and emptied. The apparatus is then moved to a new collection area and the process is repeated. This method prevents unnecessary and inefficient moving leaves and debris using a leaf blower, thereby saving the worker time and effort.

Advantages—One or more aspects have the following advantages:
(a) holds a large volume of leaves, reducing the trips for disposal
(b) provides a stable, standalone collection container while minimizing turf damage (c) protects scattering of collected debris against the force of mild wind gusts
(d) latchable large and small doors protects against spillage of collected debris when being transported
(e) allows efficient collection using low, medium and high powered leaf blowers
(f) provides mechanical leverage and wheels to lessen the effort while transporting and unloading collected leaves for disposal
(g) provides a large opening through which to blow leaves for collection
(h) provides a small door suitable to receive output from leaf vacuums and chipper/shredders
(i) provides a small door for unloading container contents to a precise location Other advantages of one or more aspects will be described in the drawings and their accompanying descriptions.

BRIEF DESCRIPTION OF DRAWINGS

FIGS. 3A-3C show a front elevation of the large door, large door handle and large door latch according to the first embodiment.

FIGS. 6A-6H show perspective and plan views of how various aspects of the apparatus are used to efficiently collect debris.

FIGS. 12A-12E show various elevation views of the apparatus according to the second embodiment including fixed wheels for transportation and spring clips for stowing the ramp.

FIGS. 17A, 17B and 18A-18C show various aspects of the apparatus according to the third embodiment including fixed wheels, swivel wheels and twin doors.

Figure 1:
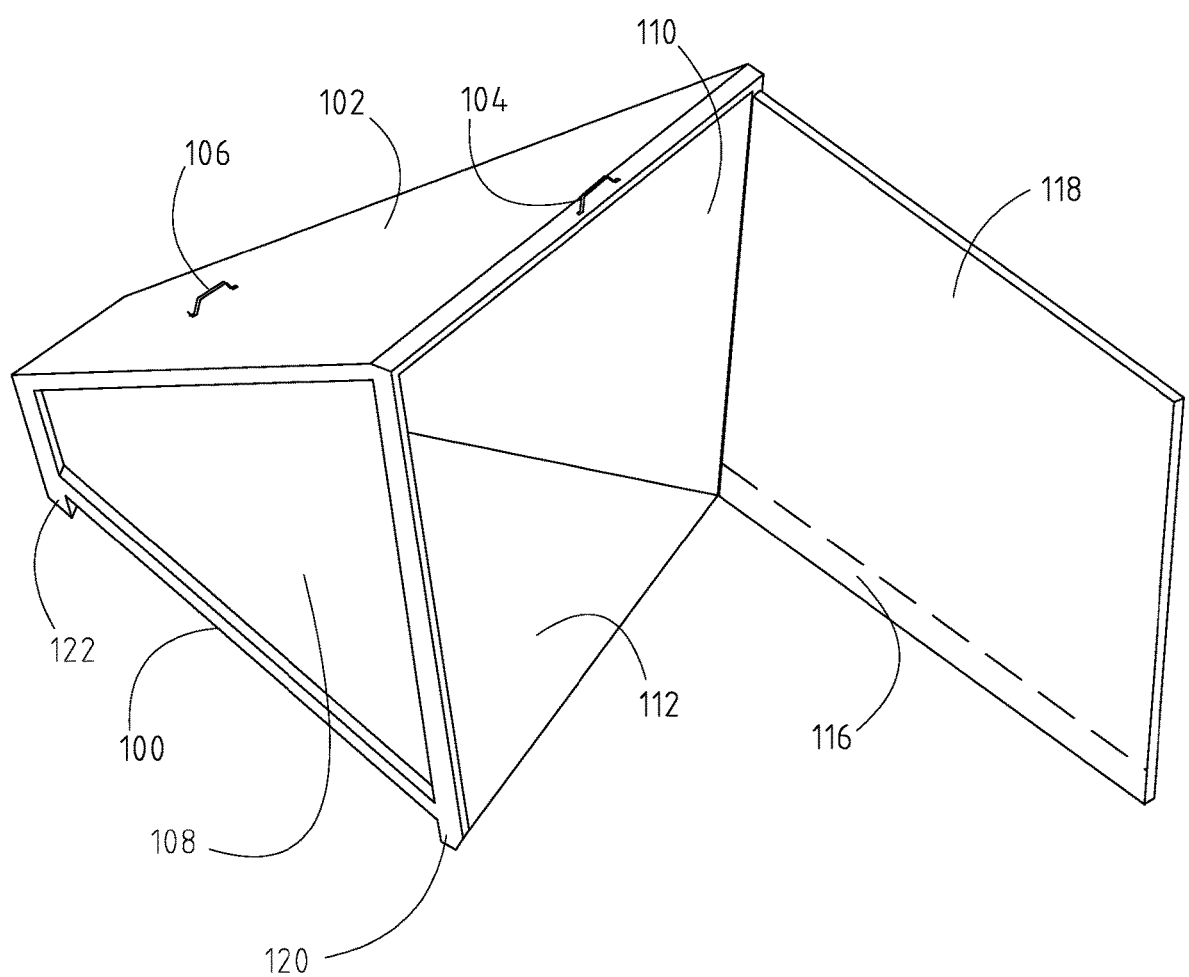
FIG. 1 shows various aspects in a perspective view of the apparatus including the frame with its coverings, the debris collection cavity and the large door according to the first embodiment.

DRAWINGS—REFERENCE NUMERALS 1 apparatus
100 frame
102 top material
104 upper top handle
106 middle top handle
108 left side material
110 right side material
112 base material
114 large door
116 large door panel
118 large door material
120 front leg
122 rear leg
200 cover plate
202 top cross brace
204 bottom cross brace
300 large door latch
302 large door handle
304 large door hinge
400 air stream
600 debris
602 leaf blower
700 barrier
800 worker
1002 short weighted rod
1004 long weighted rod
1006 sleeve
1008 extended flap
1010 ramp
1012 turf/grass
1014 soil
1016 hard surface
1100 small door
1102 small door handle
1104 small door latch
1106 small door hinge
1200 fixed wheel
1202 wedge block
1204 fixed wheel bracket
1206 spring clip
1500 low-discharge chipper/shredder
1502 high-discharge chipper/shredder
1600 refuse container
1700 swivel wheel
1702 twin door
1704 swivel wheel bracket
1800 twin door hinge
1802 twin door handle
1804 twin door latch
1806 twin door material
1808 twin door panel
1900 top cover
1902 full cover

DETAILED DESCRIPTION OF THE INVENTION

Figures and Description of the First Embodiment

Figures—The description of the first embodiment is illustrated in FIGS. 1, 2 and 3A-3C. The operation of the first embodiment is illustrated by FIGS. 4, 5, 6A-6H, 7, 8 and 9A-9C.

Figure 2:
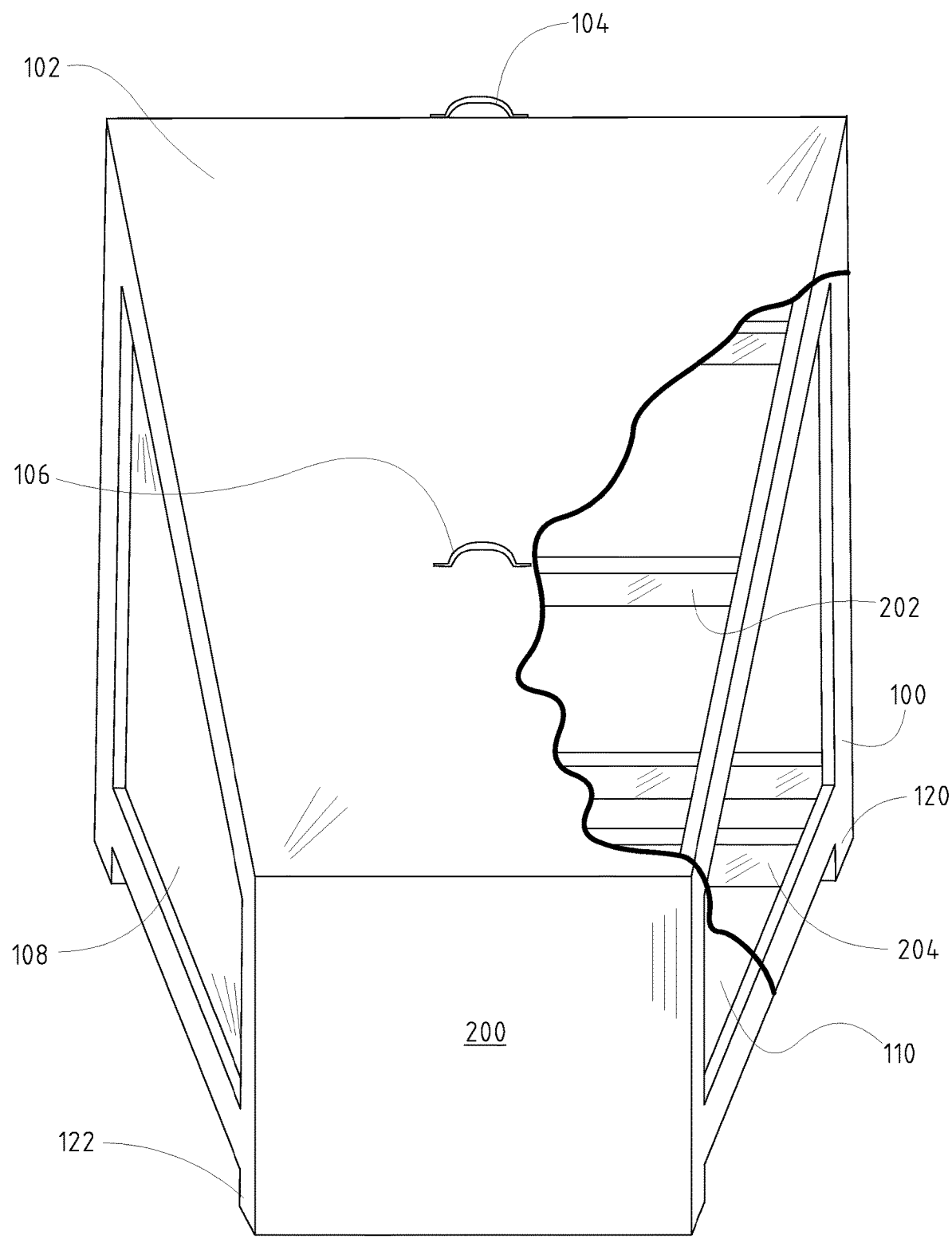
FIG. 2 shows a rear elevation view of the apparatus according to the first embodiment.

Detailed description of the first embodiment—The frame 100 is made of long, slender rigid members fastened together, as can be seen in FIG. 2. As viewed from the rear, the frame members slope simultaneously inward from the sides and downward from the top, as shown in FIG. 2. This shape is one embodiment and other shapes, sizes or proportions could be used to the same effect. The frame 100 rests on one rear leg 122 and two front legs 120, as shown in FIGS. 1 and 2. The openings in the sides of the frame 100 are covered with a woven fabric material, denoted as right side material 110 and left side material 108. An upper top handle 104 and a middle top handle 106 are attached to the top of the frame 100 for ease of lifting the apparatus 1. The upper top handle 104 is mounted to the frame 100 above the large door 114. The middle top handle 106 is mounted to the top cross brace 202. The bottom cross brace 204 is attached to the sides of the frame 100 for stability. The opening in the top of the frame 100 is covered with a perforate material, top material 102. The opening at the bottom of the frame 100 is covered with a durable, tightly woven canvas base material 112. Canvas was chosen because of its durability, but other materials could be used. The frame 100 and its coverings create an open cavity used for collection. The large door 114 is left-handed and is attached to the frame 100 by two large door hinges 304. The large door 114 is made of long, slender rigid members fastened together and is covered by a perforate large door material 118. The lowermost portion of the large door 114 is the large door panel 116. As can be seen FIGS. 3A and 3B, the large door 114 has a large door latch 300 and a large door handle 302. The large door handle 302 is used to open and close the large door 114. The large door latch 300 restricts the large door 114 from opening from pressure exerted on it by the contents in the cavity when positioned horizontally as shown in FIG. 2. The large door latch 300 provides a latching means. A simple quarter-turn screen latch is shown in this embodiment, but any suitable latch that holds the large door 114 from opening against moderate pressure (such as magnetic latches) may be used. The large door 114 is the point of entry for leaves or yard debris 600 collected within the open cavity of the apparatus 1.

As seen in FIG. 2 the opening in the frame 100 on the rear is covered by a cover plate 200 made of rigid material attached directly to the frame 100. The rear leg 122 is an extension of the cover plate 200 in this embodiment. Materials covering all of the frame 100 openings are attached using closely spaced fasteners. Material covering the large door 114 is also attached using closely spaced fasteners.

Operation of the first embodiment—The first manner to use the apparatus 1 is in the gathering of debris 600 with a leaf blower 602. The leaf blower 602 provides an air stream generating means. The apparatus 1 is prepared by placing it in the area where leaves are to be collected with the large door 114 closed.

Gathering and Collecting—The best use of the apparatus 1 is accomplished by gathering only enough debris 600 to fill the apparatus 1, and no more. Excessive gathering is inefficient, time-consuming and puts unnecessary strain on the worker 800. This is because excess gathering uses the leaf blower 602 to transport debris 600, and in doing so, the worker 800 has to blow debris 600 airborne over and over again. Reducing gathering to an absolute minimum and immediately collecting the gathered debris 600 allows for its quick and efficient transportation using the apparatus 1.

Figure 4:
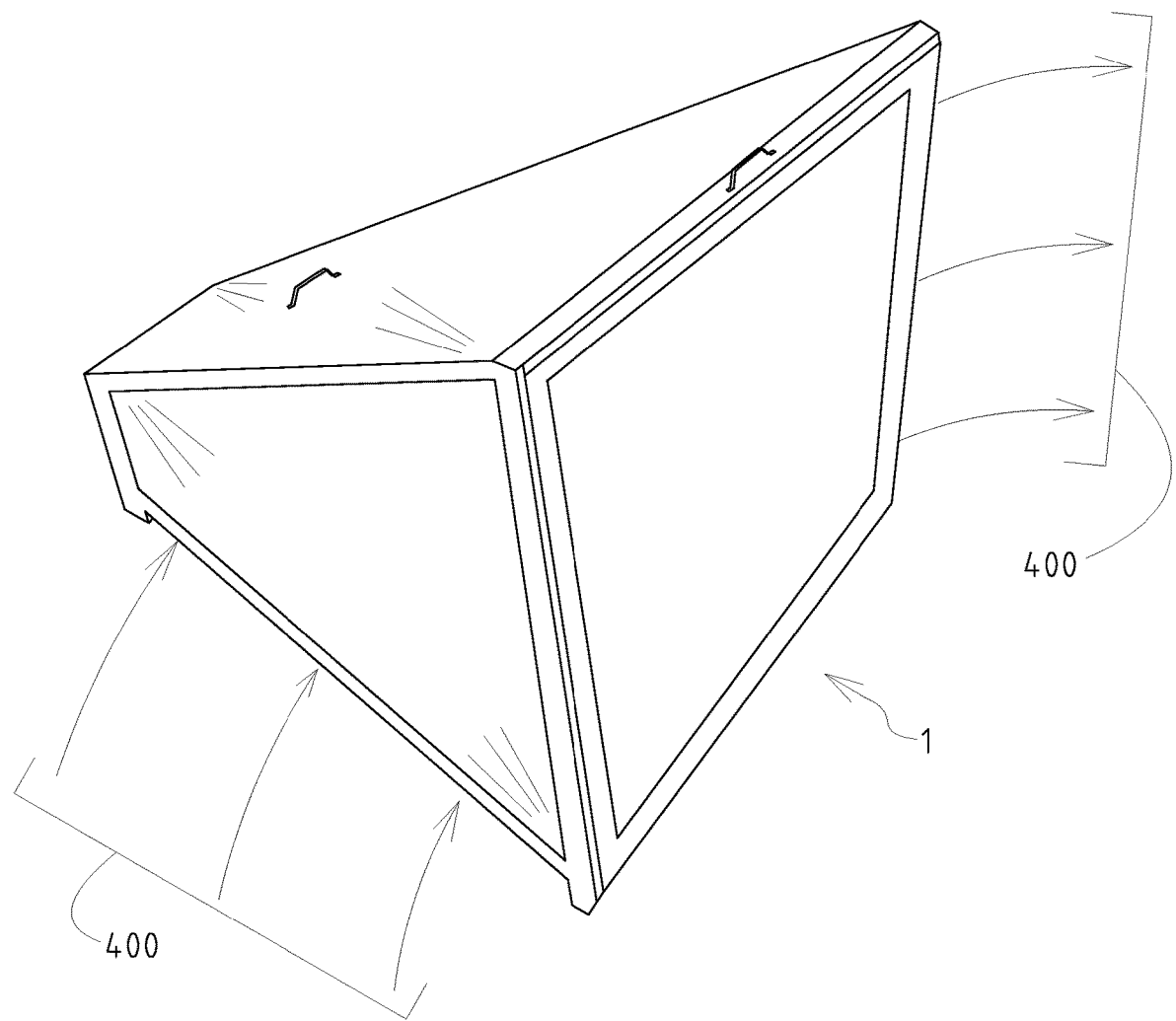
FIG. 4 shows a perspective the apparatus depicting an air stream blowing debris from underneath the apparatus.
Figure 5:
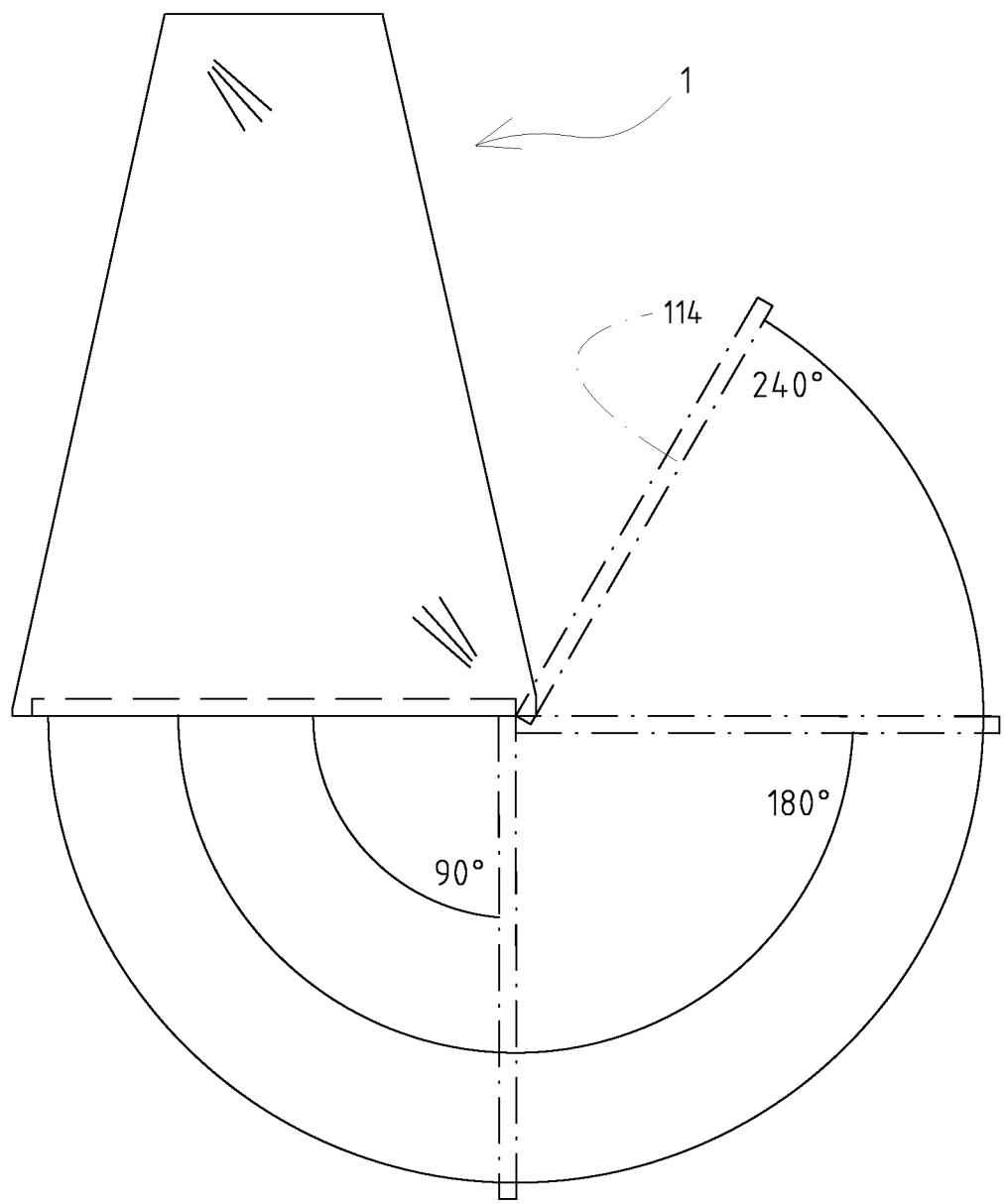
FIG. 5 shows an plan view of the apparatus depicting the large door opened to various angles.
Figure 6A:
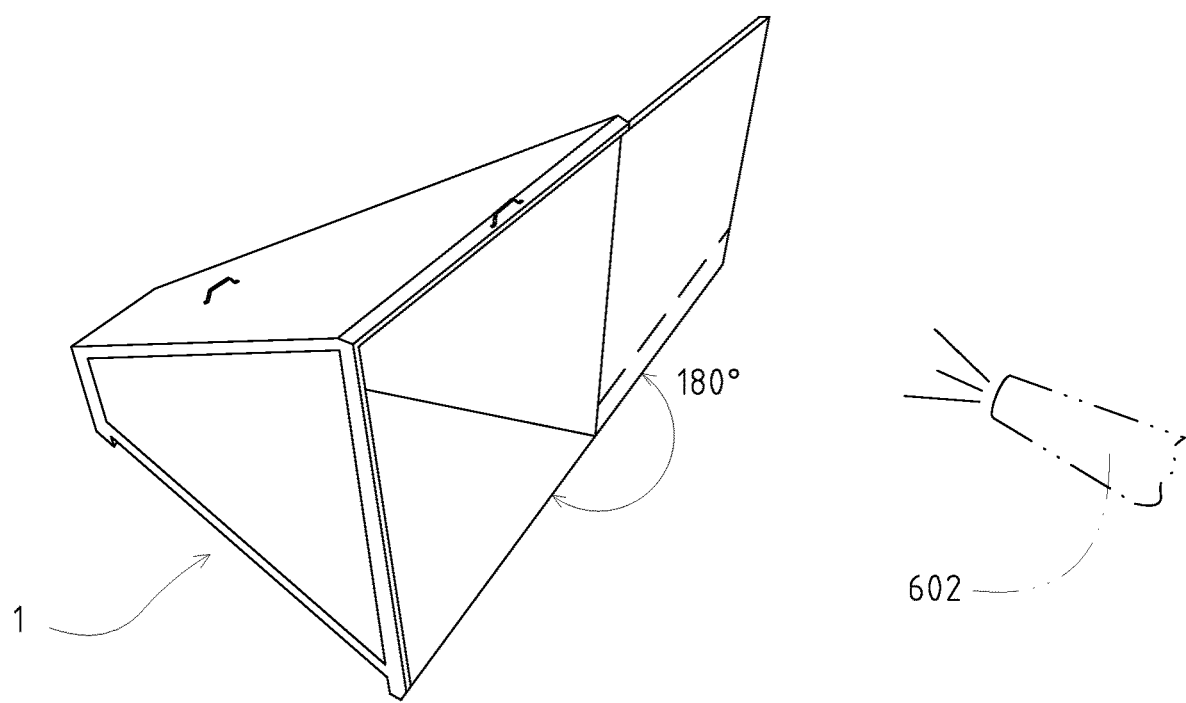

First leaves underneath the apparatus 1 are blown out by directing the air stream 400 from one side to the other as depicted in FIG. 4. The rear leg 122 and the front legs 120 provide clearance under the frame 100 which prevents the turf 1012 from being crushed or matted by the base material 112. Then leaves are then blown forward past the front edge of the apparatus 1. Next the large door 114 is opened to begin collection. As shown in FIG. 5, the large door 114 can be opened to a maximum of about 240°, but the angles 90° and 180° are key to efficient collection. To begin collection, the large door 114 is opened to 180° as shown in FIG. 6A. Debris 600 is generally blow toward the apparatus 1, ideally landing so it has a direct path to the opening of the large door 114. However the area directly in front of the open large door 114 can also be a landing target.

Figure 6B:
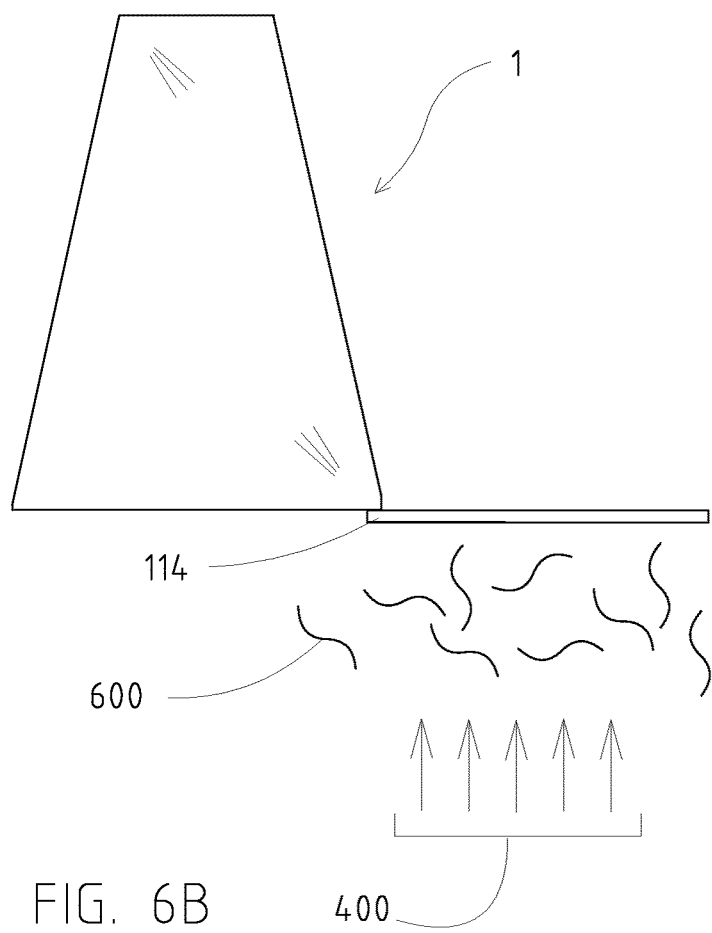
Figure 6C:
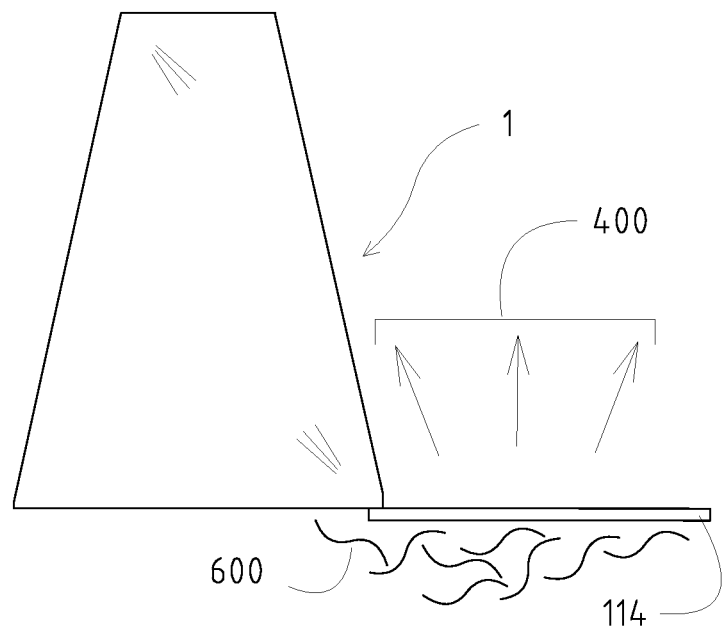

Debris 600 is gathered from the left and right generally to the center and debris 600 in the center is moved closer to the apparatus 1. When close enough for the air stream 400 to reach the apparatus 1, debris 600 is directed in a direction generally perpendicular to both the large door 114 and the cavity of the apparatus 1, as shown in FIGS. 6A and 6B. Debris 600 that lands against the large door material 118, will fall and land near the large door panel 116 depicted in FIG. 6C. This is because the large door material 118 allows the air stream 400 to past through while blocking the debris 600.

Figure 6D:
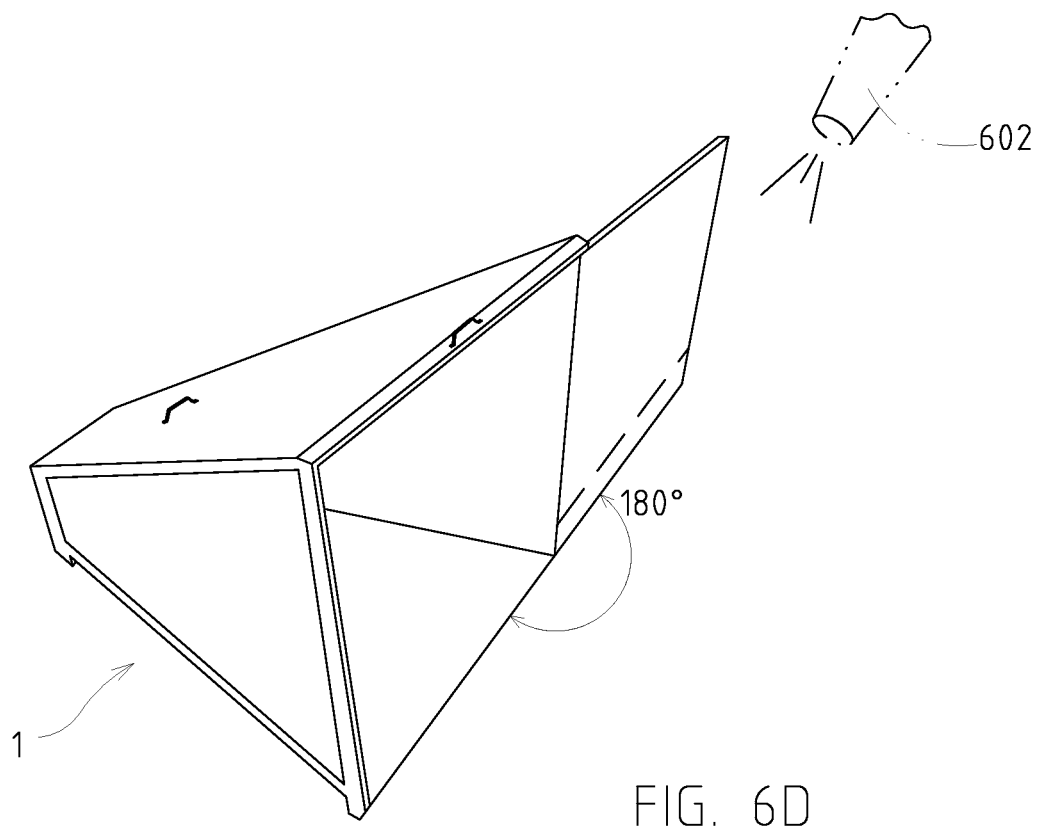
Figure 6F:
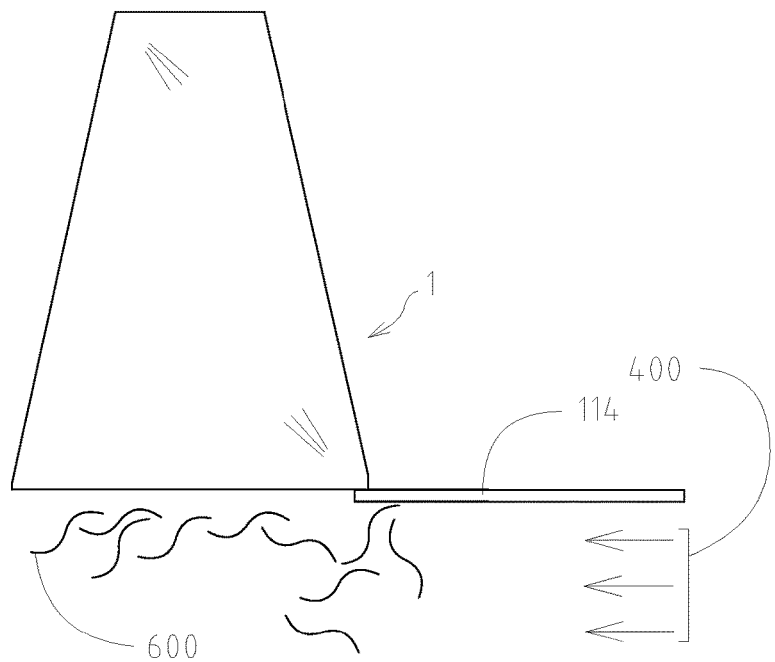
Figure 6F:
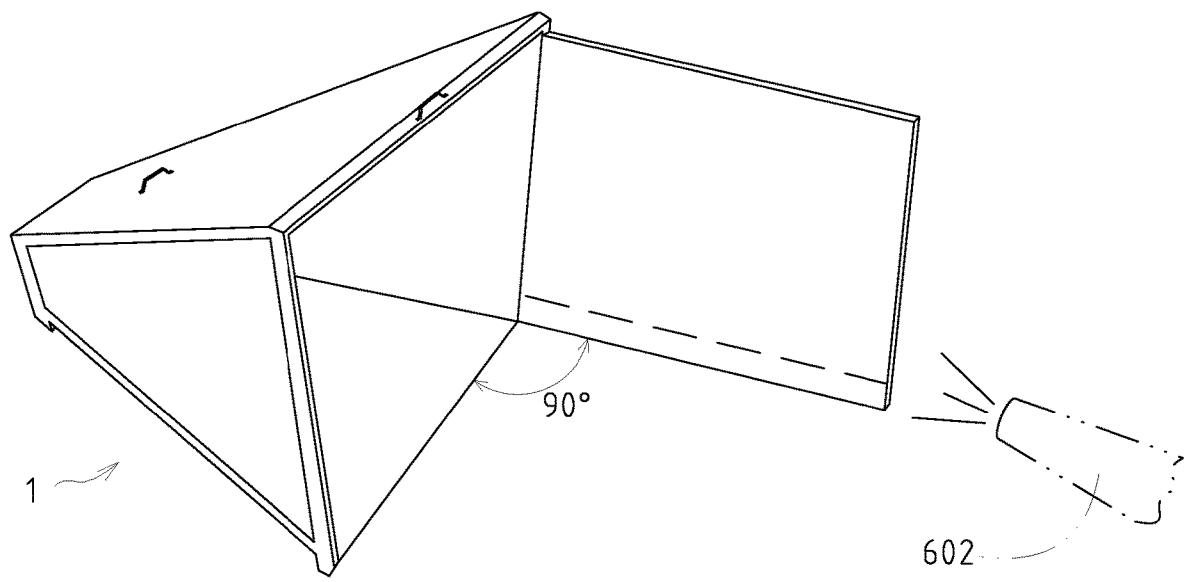
Figure 6G:
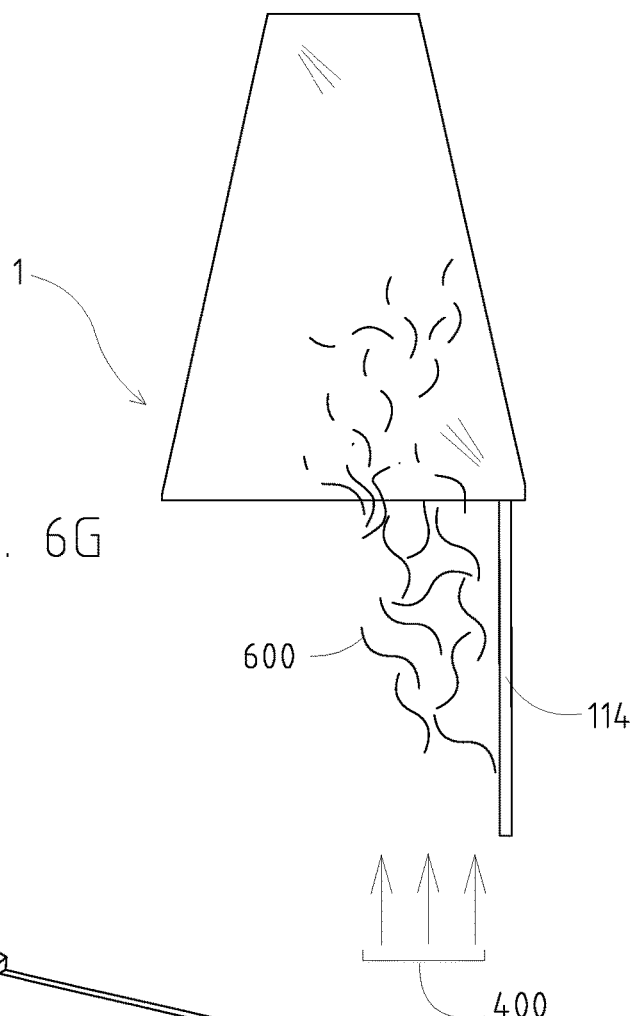
Figure 6H:
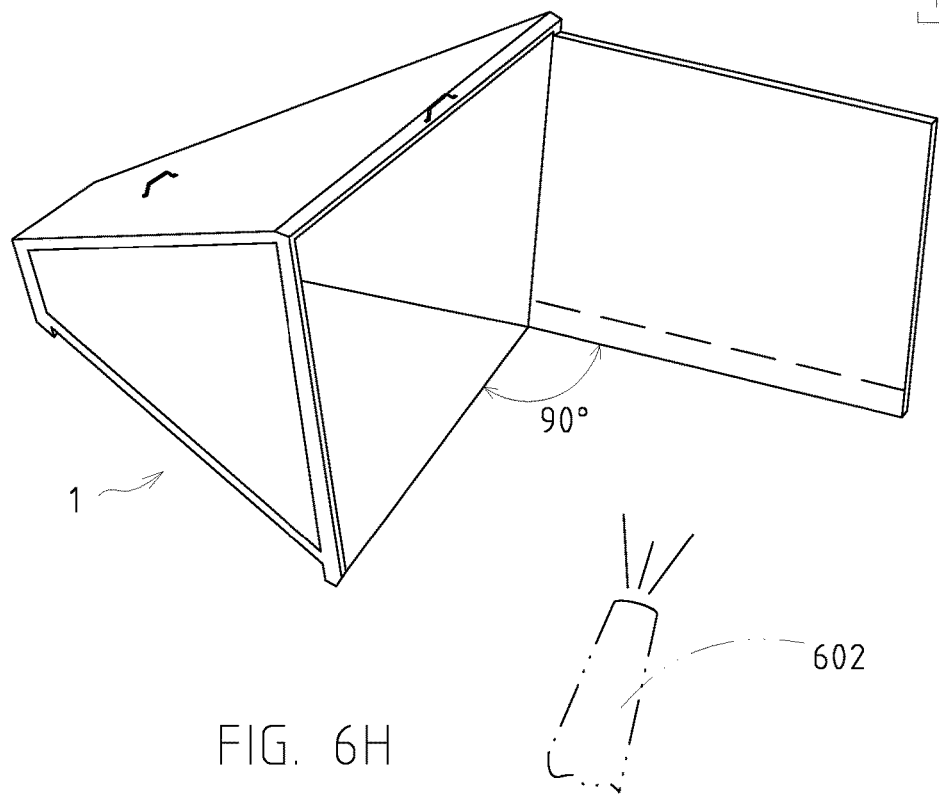

Next the air stream 400 is directed along the surface of the large door panel 116 as depicted in FIGS. 6D and 6E. Debris 600 should land in front of the opening of the large door 114 so it can be blown directly into the cavity of the apparatus 1 in the next step. The large door 114 is then placed at its 900 position and the air stream 400 is again directed along the inside surface of the large door panel 116 as depicted in FIGS. 6F and 6G. The air stream 400 directs the debris 600 into the cavity of the apparatus 1, while the large door 114 blocks debris 600 from being blown back into areas already cleared. Any debris 600 on the left side of the apparatus 1 is likewise collected by directing the air stream 400 perpendicularly against the large door 114 as depicted in FIG. 6H. This is followed by again blowing the debris 600 along the inside surface the large door panel 116 as previous described, which was depicted in FIG. 6G.

Figure 7:
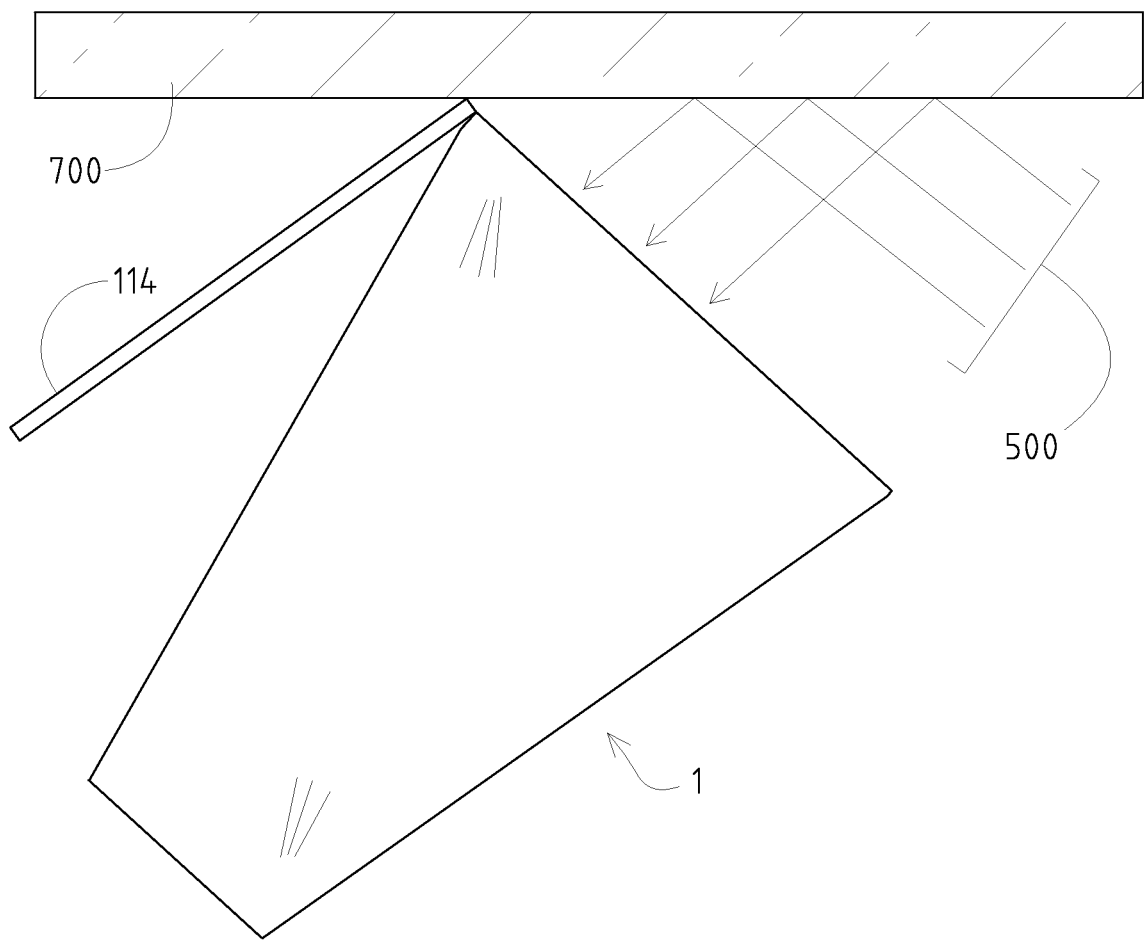
FIG. 7 shows a plan view of the apparatus placed against a barrier and depicts the air stream originating from the right.

Collection against barriers—If there is a desire to collect leaves from an area near a barrier 700 such as a wall, the barrier 700 can be used to assist in the collection of debris 600, as shown in FIG. 7. The apparatus 1 is prepared by fully opening the large door 114 as shown in FIG. 7. The apparatus 1 is placed against the barrier 700 at an acute angle between the barrier 700 and the front plane of the apparatus 1, as viewed from above. FIG. 7 shows the right side of the apparatus 1 against the barrier 700, but the left side may also be used. Debris 600 can be directed into the cavity by reflecting it off the barrier 700 and into the cavity of the apparatus 1.

Wind protection—Debris 600 already collected is protected from wind gusts because the right side material 110, left side material 108 and top material 102 diffuse the concentration of wind so that it does not blow the debris 600 out of the cavity back into the collection area. The large door 114 can be used as a wind shield allowing protection from wind as debris 600 is being blown toward and into the cavity.

Figure 8:
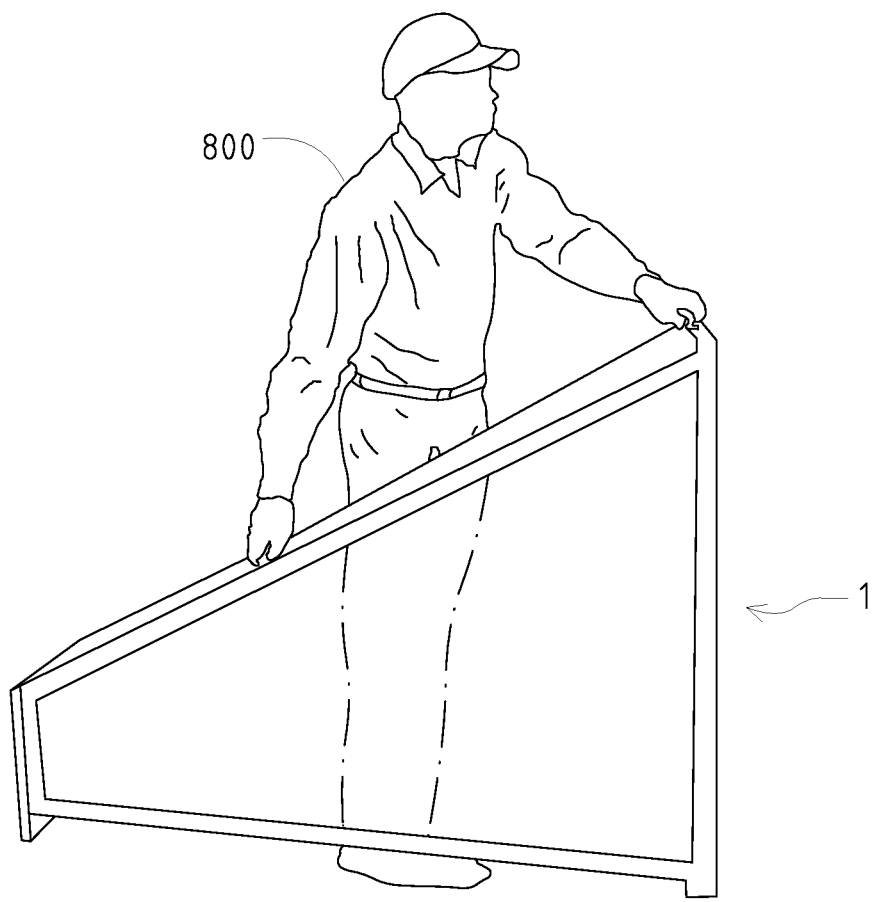
FIG. 8 shows a perspective view of the apparatus lifted to a carrying position.
Figure 9A:
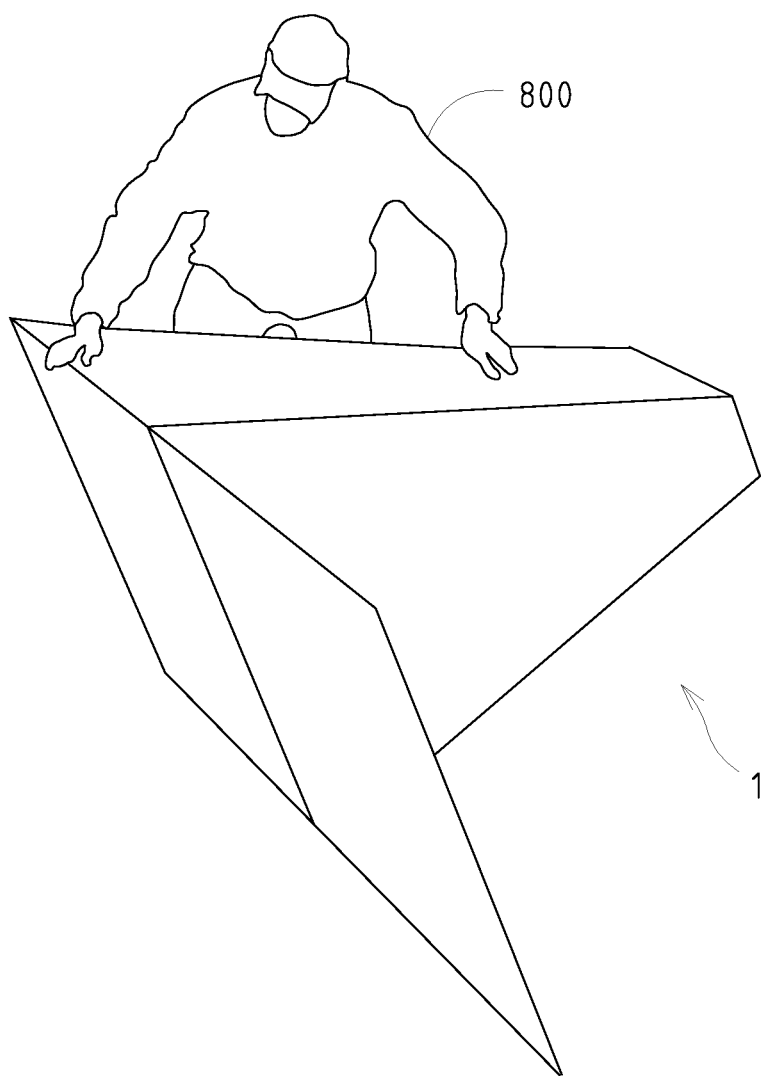
FIGS. 9A-9C show perspective views of the apparatus depicting the tilt and lift actions to unload the apparatus.
Figure 9B:
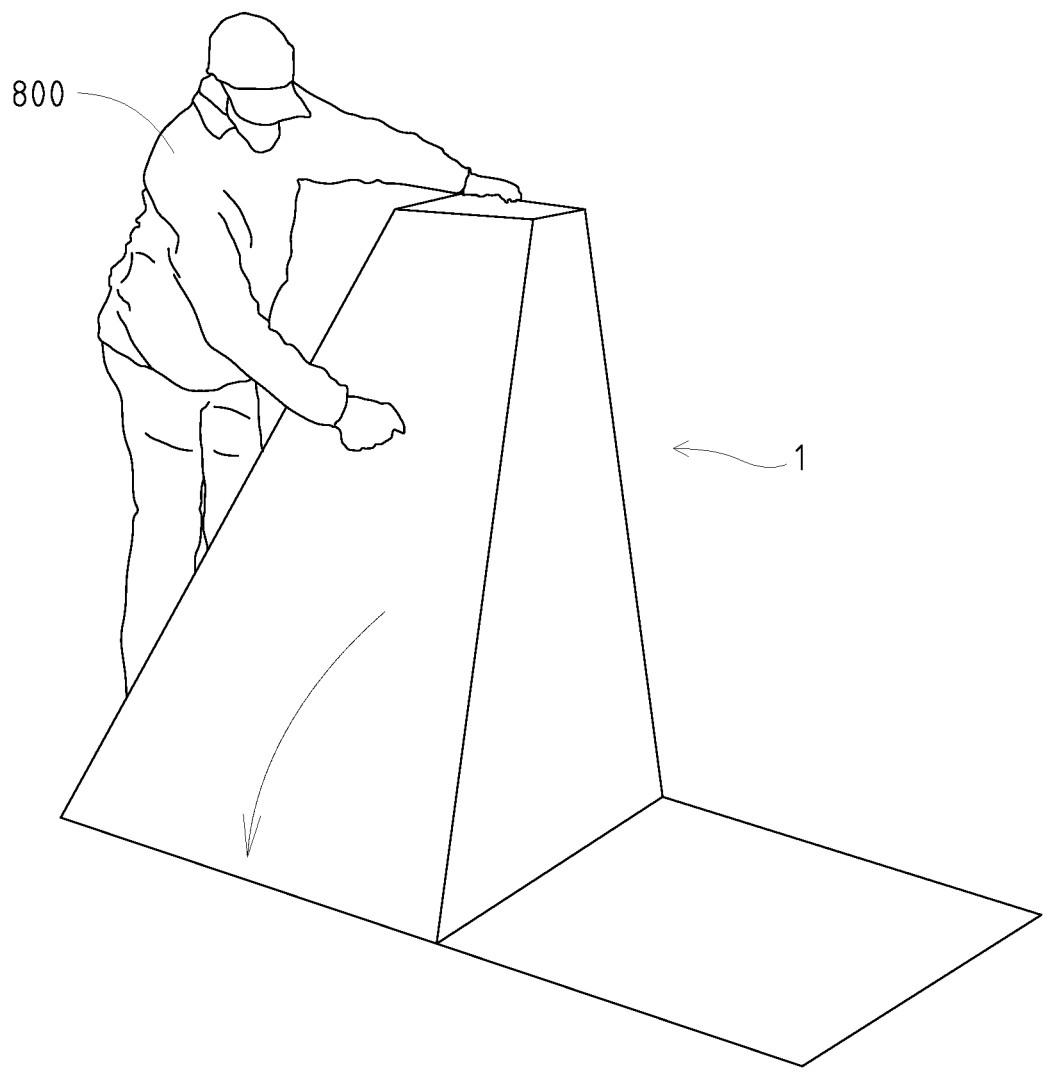
Figure 9C:
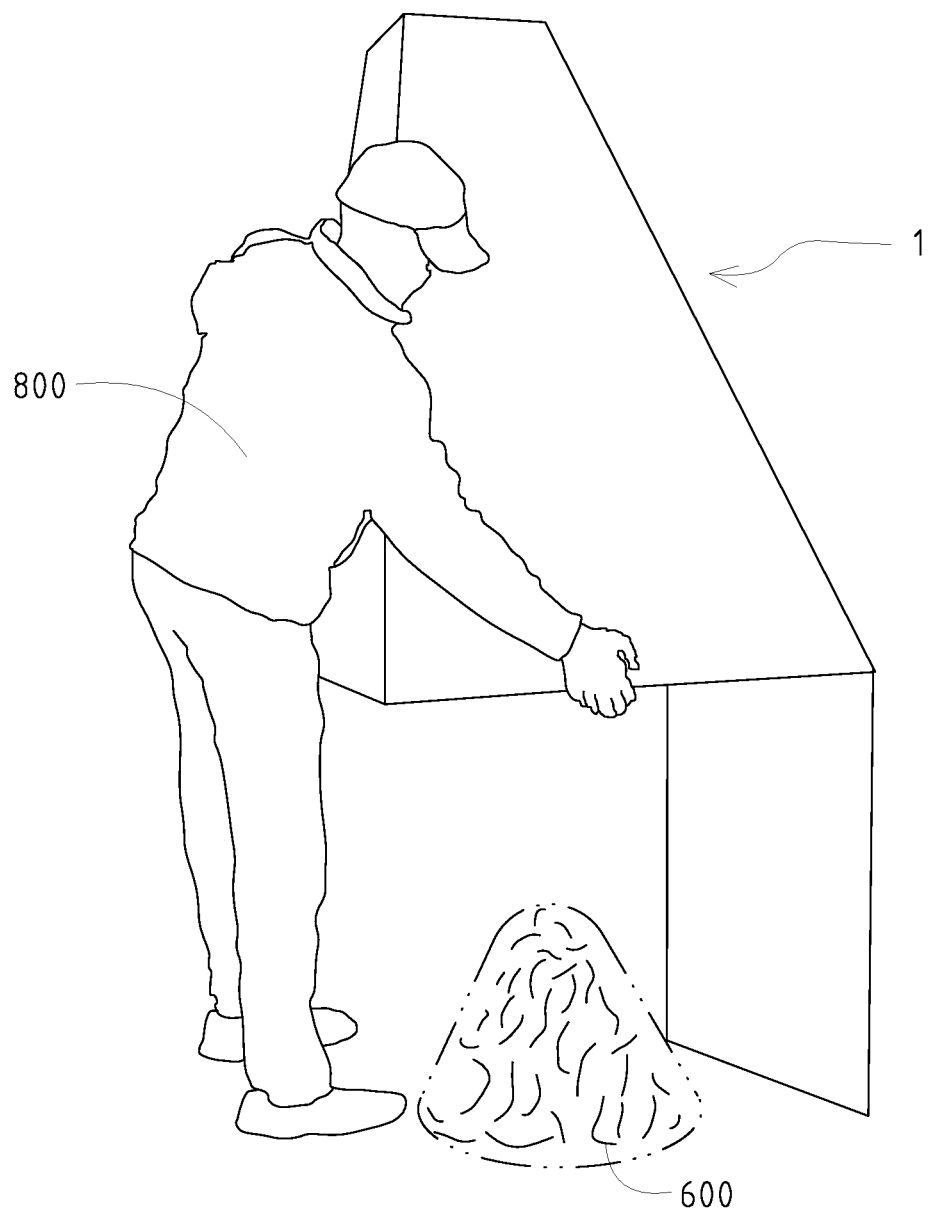

Moving the apparatus filled with yard debris—Handles are provided to assist in moving the apparatus 1 from one area to another. As shown in FIGS. 1 and 2, the upper top handle 104 and middle top handle 106 are attached to top of the frame 100 and the top cross brace 202, respectively. This allows the apparatus 1 to picked up and carried (see FIG. 8). A worker 800 has the option to move the apparatus 1 with the large door 114 open, if it is not filled to capacity. This is useful when the apparatus 1 needs to be moved only a short distance, typically to a new collection area. For movement over longer distances, such as to unload, the large door 114 is closed and latched. The apparatus 1 is then picked up, as shown in FIG. 8, and carried to its destination.

Unloading the apparatus—Upon reaching the destination, the worker 800 sets the apparatus 1 back on the ground. The worker 800 moves to face the large door 114. The large door latch 300 is released and the large door 114 is swung open to its 180° position (see FIG. 5). The worker 800 moves to the left side, and turns to face the apparatus 1. Putting his or her left hand on the middle top handle 106 and right hand on the upper top handle 104, the worker 800 rotates the upper top handle 104 in an arc downward, pivoting at the bottom of frame 100 (see FIG. 9A). As the apparatus 1 reaches its tipping point, the worker 800 switches hands so that his or her right hand is on the middle top handle 106 and his or her left hand grasps rear leg 122, which is directly below the cover plate 200. Using both hands the worker 800 controls the final rotation (see FIG. 9B) until the opening of the large door 114 and large door 114 rest flatly on the ground and the cover plate 200 faces upward.

In this position the contents of the cavity fall to the ground and the worker 800 only needs to lift the empty apparatus 1 off of the pile of debris 600, leaving it behind. To lift the apparatus 1 the worker 600 grasps the upper top handle 104 with his or her right hand, grasps the bottom of the frame 100 with his or her left hand and then lifts the apparatus 1 straight up (see FIG. 9C). The worker 600 swings the apparatus 1 away from the pile of debris 600 and sets it on the ground. The sloping shape of the cavity ensures debris 600 does not clog as it exits the cavity.

Figures and Description of the Second Embodiment

Figures—The description of the second embodiment is illustrated in FIGS. 10A-D, 11 and 12A-E. The operation of the second embodiment is illustrated by FIGS. 10A-D, 11, 13A-C, 14, 15A and 16.

Figure 10A:
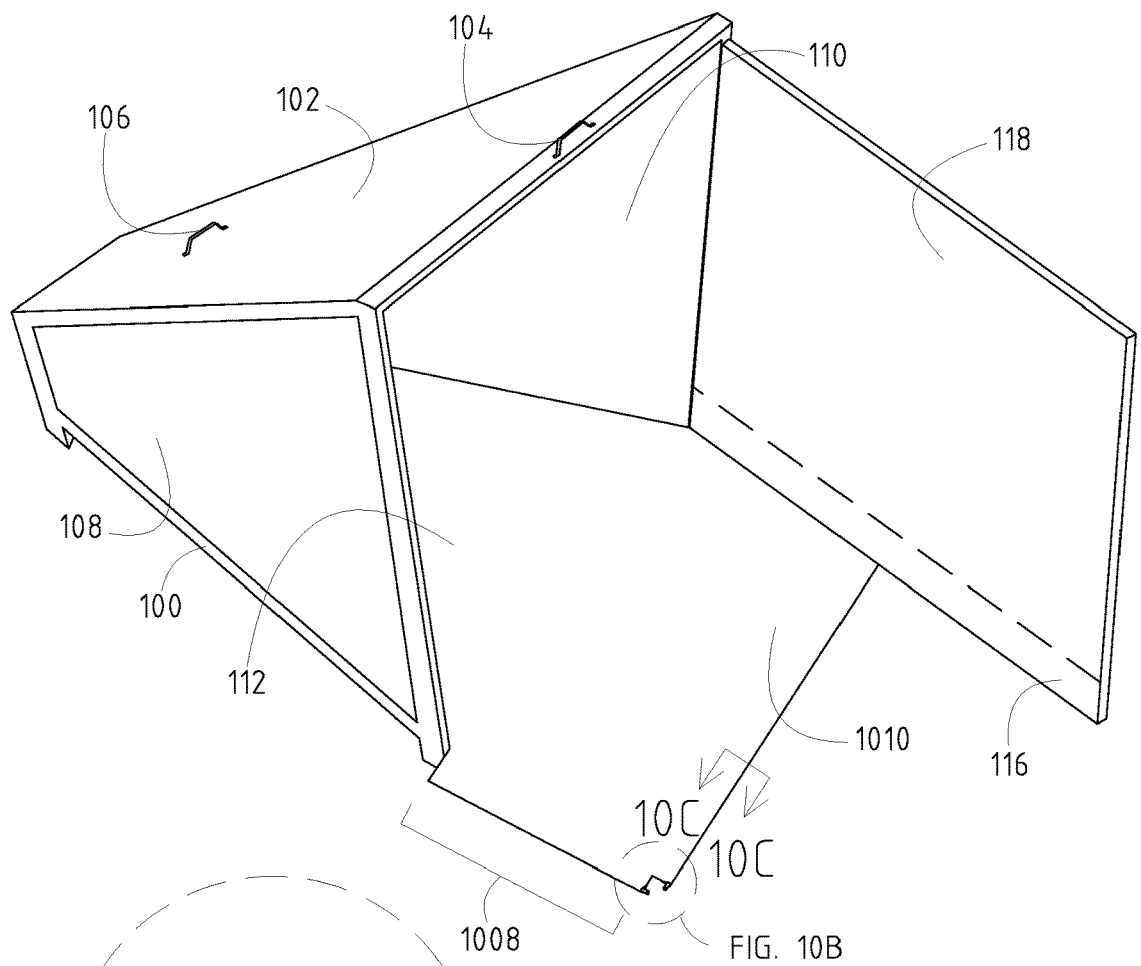
FIGS. 10A-10D show various aspects in perspective and elevation views of the apparatus according to the second embodiment, including the ramp, used to facilitate debris collection.
Figure 10B:
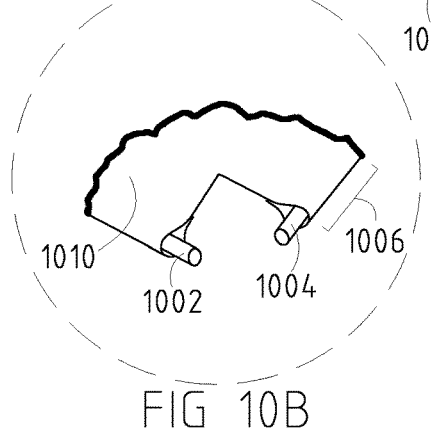

Detailed description of the second embodiment—As shown in FIG. 10A the second embodiment has an extended flap 1008 slightly wider than the bottom of the door opening and extends for a nominal distance farther through the opening of the large door 114. The extended flap 1008 is so named because it extends the base material 112. Sleeves 1006 are sewn on the three perimeter edges of the extended flap 1008 to house two short weighted rods 1002 and one long weighted rod 1004. The corners of the extended flap 1008 are cut to provide access to the two short weighted rods 1002 and the long weighted rod 1004 so they can be easily grasped for insertion and removal. FIG. 10B shows a detail of the corner of the extended flap 1008. The sleeves 1006 housing the long weighted rod 1004 and short weighted rods 1002, may instead be pockets with closed corners. Any weighted material instead of rods may be used, such as metal shot, pebbles or sand. The extended flap 1008, two short weighted rods 1002, long weighted rod 1004 and sleeves 1006 make up the ramp 1010. The ramp 1010 provides the load-assist means for the apparatus 1.

Figure 10C:
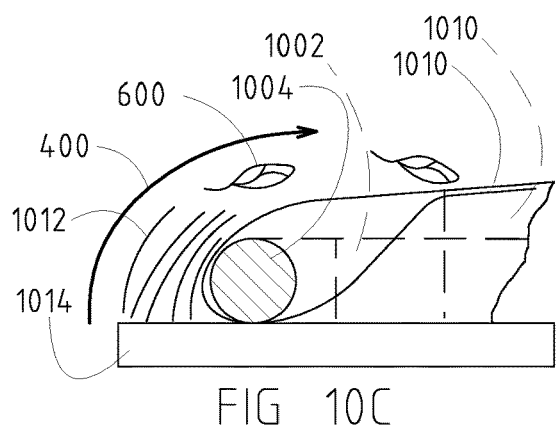

If the apparatus 1 is placed on a surface such as grass or turf 1012, the weight around the perimeter of the ramp 1010 causes it to nestle into the turf 1012, coming to a rest on the soil 1014 (see FIG. 10C). As debris 600 is blown up and onto the ramp 1010 by an air stream 400, it is more easily blown into the cavity. Since this debris 600 is not allowed to settle back into the turf 1012, collection is more thorough giving the turf 1012 a cleaner appearance.

If debris 600 is to be collected from a hard surface 1016, such as a deck, patio or driveway, the ramp 1010 can similarly be used. Instead of nestling into the surface, the ramp 1010 sits on the hard surface 1016 (see FIG. 10D). Due to the low profile of the ramp 1010, debris 600 is easily blown onto the surface of the ramp 1010. This makes the ramp 1010 effective in collecting normal debris 600 and especially effective at collecting small and heavier debris 600.

Figure 11:
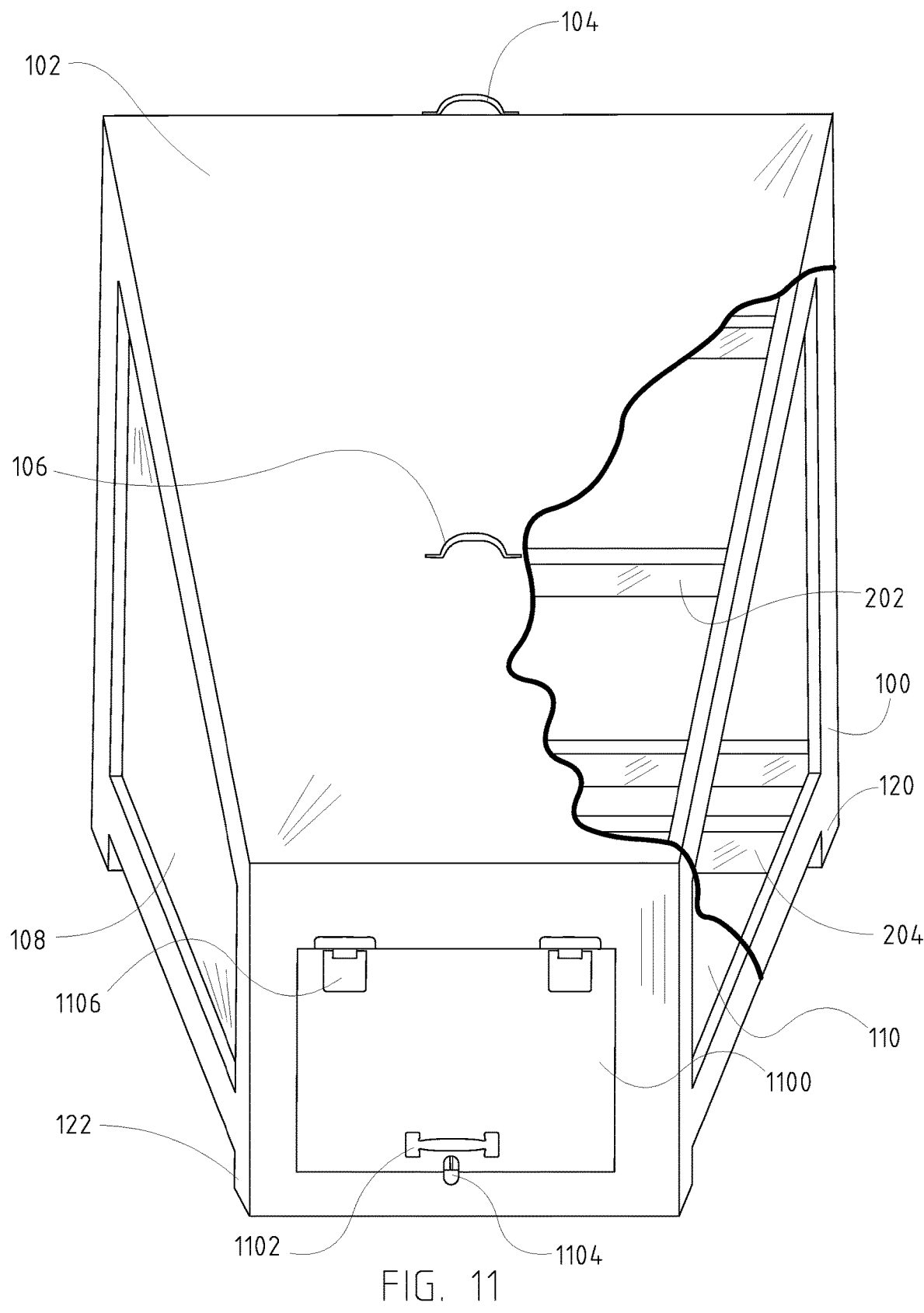
FIG. 11 shows a rear elevation the apparatus according to the second embodiment including the small door.

The small door 1100 is shown in FIG. 11. The small door 1100 is connected to the frame 1 by two small door hinges 1106. The small door 1100 is made from rigid material such as plywood, although other materials could be used. Similar to the large door 114, the small door 1100 has a small door handle 1102 and a small door latch 1104. When latched, as shown in FIG. 11, the small door 1100 is restricted from opening from pressure exerted on it by the contents in the cavity. The small door latch 1104 also prevents the small door 1100 from opening when moving and unloading the apparatus 1, as described in the operation of the second embodiment section following. The small door latch 1104 provides a latching means.

The fixed wheels 1200 are shown in FIG. 12A. Left and front views of a single fixed wheel 1200 are shown in FIGS. 12B and 12C, respectively. Installed between the large door panel 116 and the fixed wheel bracket 1204 is a wedge block 1202. The wedge block 1202 allows both the fixed wheel 1200 and its fixed wheel bracket 1204 to have ground clearance in their near-horizontal mounting as depicted in FIG. 12B. This ground clearance prevents the fixed wheel bracket 1204 from causing turf damage as the large door 114 is opened and closed. The fixed wheels 1200, wedge block 1202 and fixed wheel bracket 1204 provide a rolling transportation means. Two spring clips 1206 for stowing the ramp are mounted to the frame 100 on either side of the large door 114 as shown in FIG. 12A. Detailed and right elevation views of a spring clip 1206 are shown in FIGS. 12D and 12E, respectively. The spring clips 1206 provide a stowable means for the ramp 1010.

Operation of the second embodiment—The operation of the apparatus 1 according to the second embodiment is only slightly different than from the first embodiment. The differences are noted below.

Apparatus preparation—The apparatus 1 is prepared for collection by closing both the large door 114 and small door 1100. Debris 600 is blown from under the apparatus 1 and the large door 114 is opened. After opening the large door 114, the worker 800 removes the ramp 1010 from the cavity and inserts the two short weighted rods 1002 and the long weighted rod 1004. The long edge of the ramp 1010 is fully extended away from the opening of the large door 114 and the short edges of the ramp 1010 are extended to the left and right and placed on the ground. FIG. 10A shows the ramp 1010 prepared for collection.

As the worker 800 moves in close to the cavity, the design of the ramp 1010 provides better debris 600 collection. The two short weighted rods 1002 and long weighted rod 1004 on three sides of the ramp 1010 allow the worker 800 to work equally effectively from all three sides. After clearing the large debris 600, if there is smaller or heavier debris 600 left behind in the turf 1012, the worker 800 can re-work the area by blowing the smaller or heavier debris 600 onto the ramp 1010 and into the cavity of the apparatus 1. This prevents a dregs-effect where the last point of collection is left with a concentration of nuts, sticks, partial leaves and other small items.

Figure 13A:
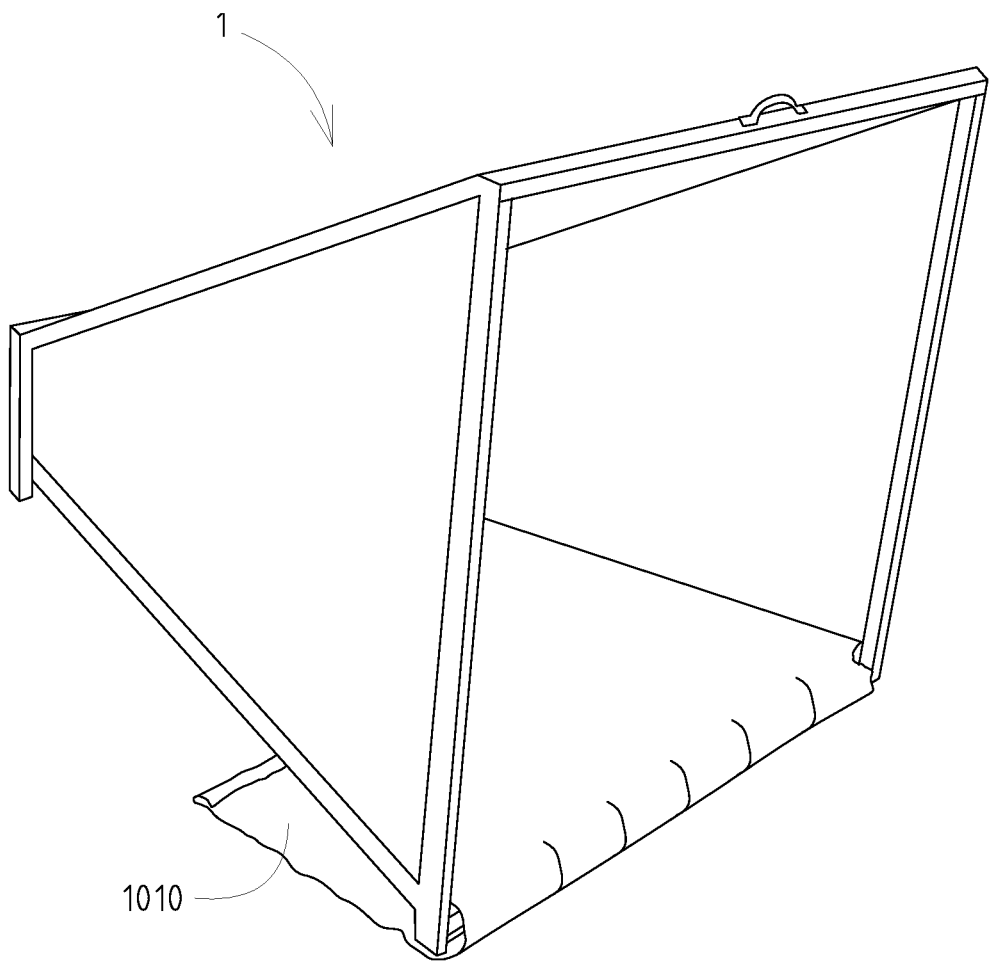
FIGS. 13A-13C show perspective views of various ways to stow the ramp.

Collection against barriers—When collecting against barriers as shown in FIG. 7, ramp 1010 can be folded under the apparatus 1 as shown in FIG. 13A.

Figure 10D:
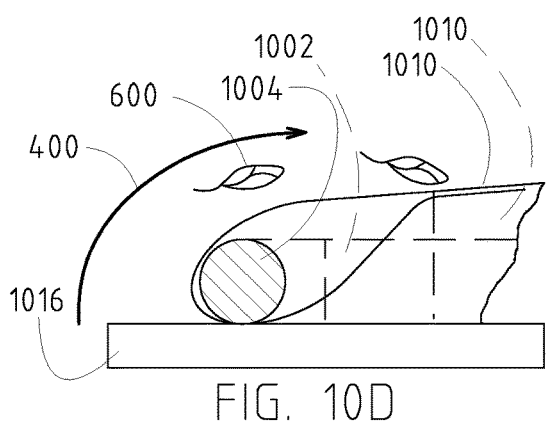

Collection on hard surfaces—If the worker 800 desires to collect debris 600 from a hard surface 1016, such as leaves blown onto a deck, patio or driveway, the ramp 1010 can similarly be used (see FIG. 10D). Once debris 600 is blown onto the ramp it is more easily blown into the cavity.

Moving the apparatus filled with yard debris—The upper top handle 104 and middle top handle 106 are fitted to the top of the frame 100 and top cross brace 202, respectively. They allow the apparatus 1 to picked up (see FIG. 8) and carried, as described in the first embodiment. If the cavity is not completely filled, but movement would cause leaves to spill out of the cavity, a gap of predetermined width exists between the frame 100 and the large door 114 to allow the large door 114 to close with the ramp 1010 extended.

Figure 13B:
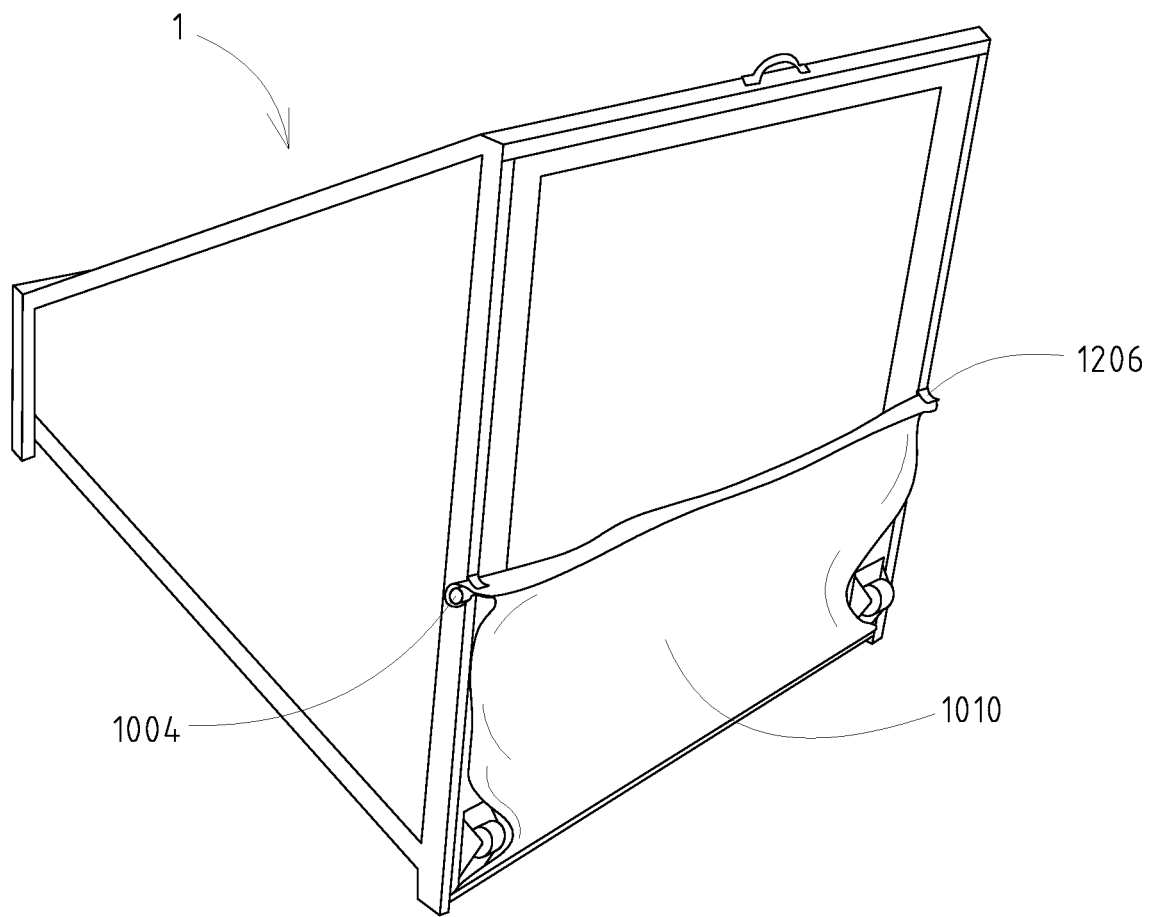
Figure 13C:
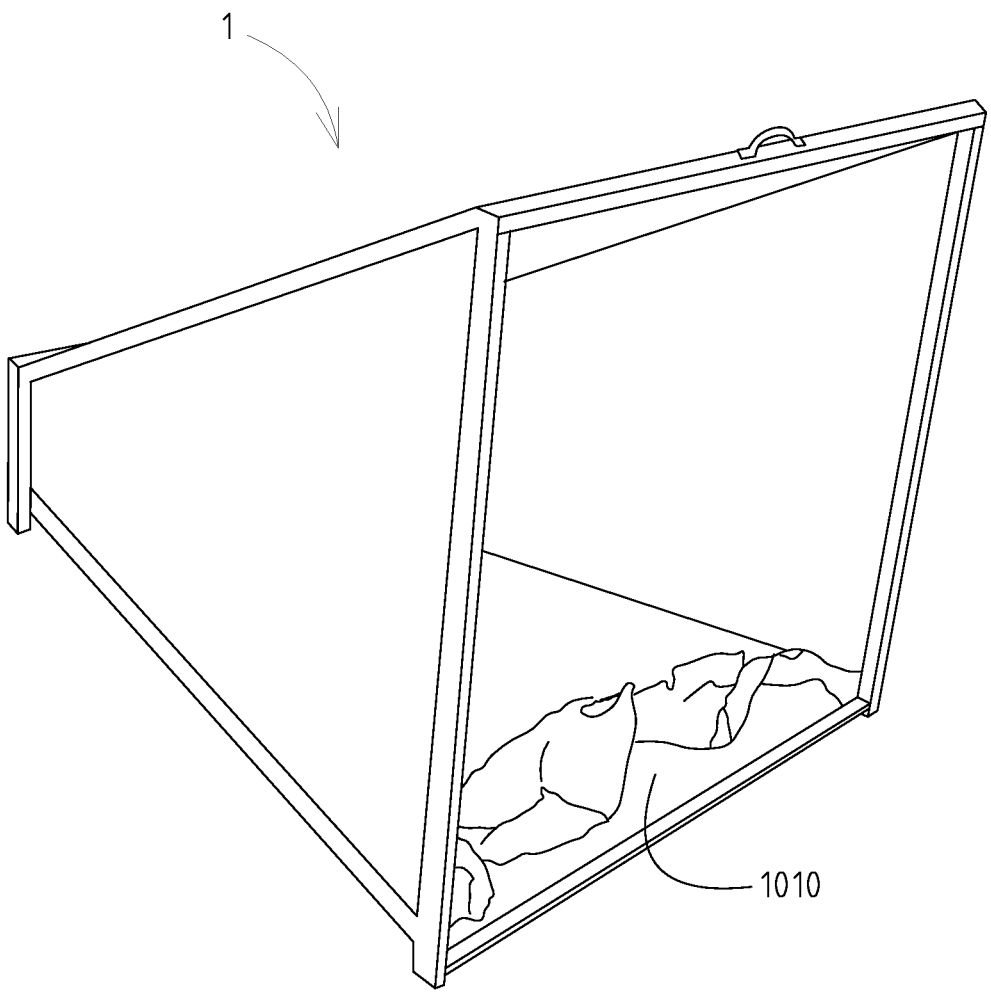
Figure 14:
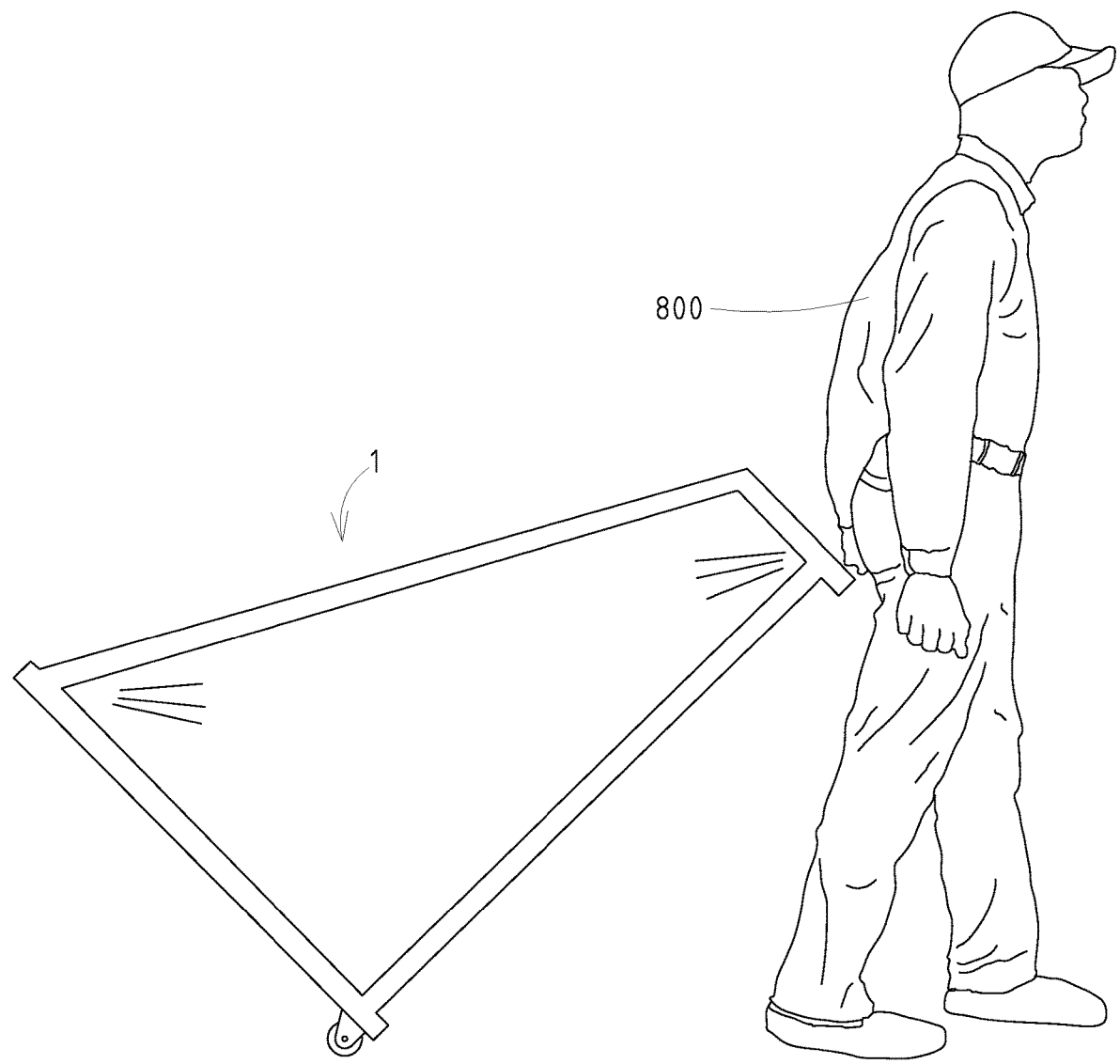
FIG. 14 shows a perspective view of the tilted apparatus being rolled by a worker.

When the cavity of the apparatus 1 becomes filled to capacity, the large door 114 is then closed and latched with the large door latch 300. The ramp 1010 is rotated up and stowed using spring clips 1206 mounted to the frame 100 as shown in FIG. 13B. Alternatively the two short weighted rods 1002 and long weighted rod 1104 may be removed from the ramp 1010. The ramp 1010 may then be folded into the interior of the cavity (see FIG. 13C).

The apparatus 1 is urged to its destination using the following steps. The worker 800 moves to the rear of the apparatus 1, reaches down and lifts the end of the apparatus 1 by the small door handle 1102. Upon standing, the worker 800 turns and walks, rolling the apparatus 1 along (see FIG. 14). As the worker 800 stands, the end he or she is holding is raised while the opposite end remains on the ground. The frame 100 acts as a lever to provide the worker 800 with the mechanical leverage needed to comfortably lift and hold the loaded apparatus 1 in this tilted position. The action of the worker 800 lifting one end of the apparatus 1 causes the fixed wheels 1200 to swing down and contact the ground. With the apparatus 1 tilted the worker 800 can roll it to the unloading area with minimal effort.

Unloading the apparatus—The worker 800 moves to face the large door 114. The worker 800 removes the ramp 1010 from the spring clips 1206 and stows it under the apparatus 1. The large door latch 300 is released and the large door 114 is swung open to its 1800 position. Just as in the first embodiment the worker 800 tilts to unload the apparatus 1 until it stands with the small door 1100 facing up. However, in this embodiment the worker 800 grasps the small door handle 1102 instead of the rear leg 122 (see FIG. 9B). The worker 800 then lifts the apparatus 1 straight up while the contents in the cavity remain on the ground. This tilt-roll-tilt-lift (TRTL) method of moving and unloading the apparatus 1 minimizes the strength needed to unload the apparatus 1 because the worker 800 never has to bear the full weight of the loaded apparatus 1. After unloading the worker 800 sets the apparatus 1 back on the ground, closes the large door 114, stows the ramp 1010 using the spring clips 1206 and rolls or carries the apparatus 1 to the next collection area.

Figure 15A:
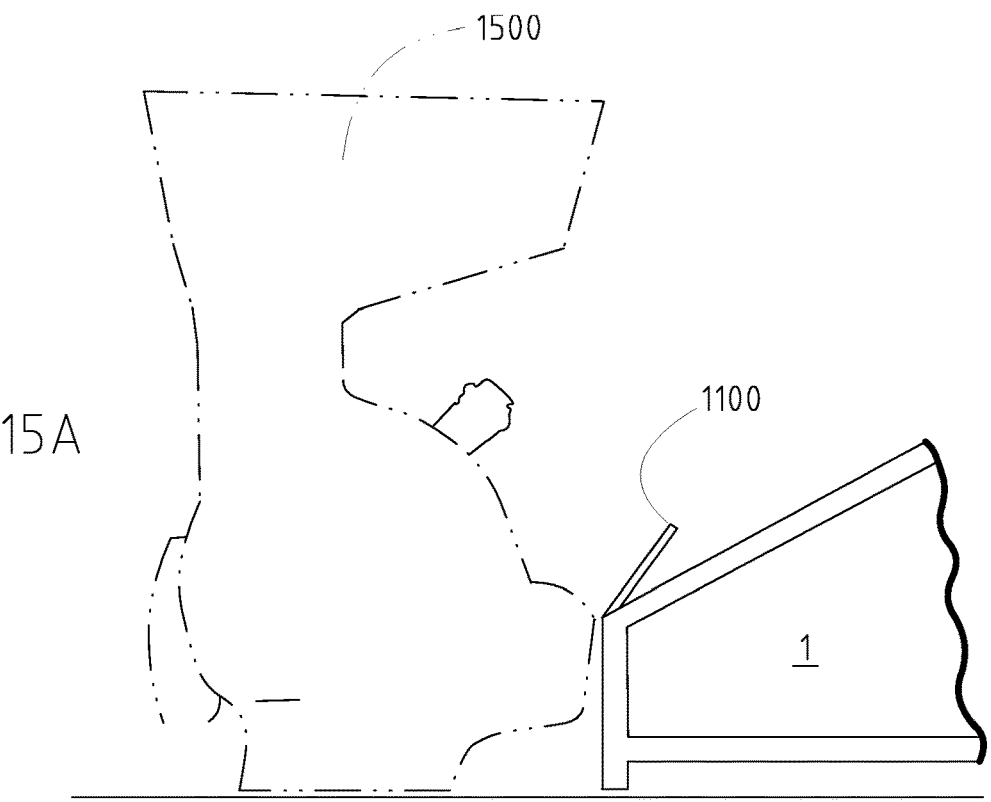
FIGS. 15A and 15B show elevation views of the apparatus being loaded by chipper/shredders.

Loading via small door—chipper/shredder—The small door 1100 allows the apparatus 1 to capture the output of a chipper/shredder (see FIG. 15A). For low-discharge chipper/shredders 1500, the large door 114 is closed and the small door 1100 is opened. A low-discharge chipper/shredder 1500 can be positioned so that its discharge enters though the small door 1100 and is captured inside the cavity. The base material 112 provides durability against abrasion and tears from wood chips, acorns and other foreign items traveling at high velocities.

The apparatus 1 filled with shredded material is urged to its destination using a similar sequence of steps used when filled with yard debris 600. The apparatus 1 is prepared by closing and latching the small door 1100 (see FIG. 3). Once the apparatus 1 is prepared, the steps to urge it to its destination are identical to those described earlier when the apparatus 1 was filled with un-shredded debris 600. However, the density of un-shredded debris 600 is low compared to the density of shredded debris 600. Because of this density difference, the apparatus 1 fully loaded with shredded debris 600 will be much heavier than if loaded with un-shredded debris 600. When attempting to move and unload the apparatus 1 full of shredded debris 600, use of the tilt-roll-tilt-lift (TRTL) method described earlier is key to provide the worker 800 with the ability to manage the increased weight with minimal effort.

Loading via small door—leaf vacuum—The small door 1100 accepts output from leaf vacuums that discharge via a hose, where the leaf vacuum discharge hose is inserted through the small door 1100 opening. Alternatively a push-to-connect type hose connection could be installed in the small door 1100.

Use of the small door 1100 for loading allows an alternate approach to debris 600 gathering and collection, where a leaf vacuum is used in tandem with a leaf blower 602. A leaf vacuum may be used to initially collect heavy concentrations of fallen debris 600. When debris 600 becomes sparse and vacuuming becomes less efficient, the leaf blower 602 may then used to gather the remaining debris 600 into piles. These piles can either be collected using a leaf blower 602, as described earlier, or vacuumed up and collected via the small door 1100. The apparatus 1 provides a large volume capacity and it is easily moved along with the leaf vacuum. Most leaf vacuums also provide some shredding capability so the volume of debris 600 may be reduced, thereby reducing the number of trips for disposal.

Figure 16:
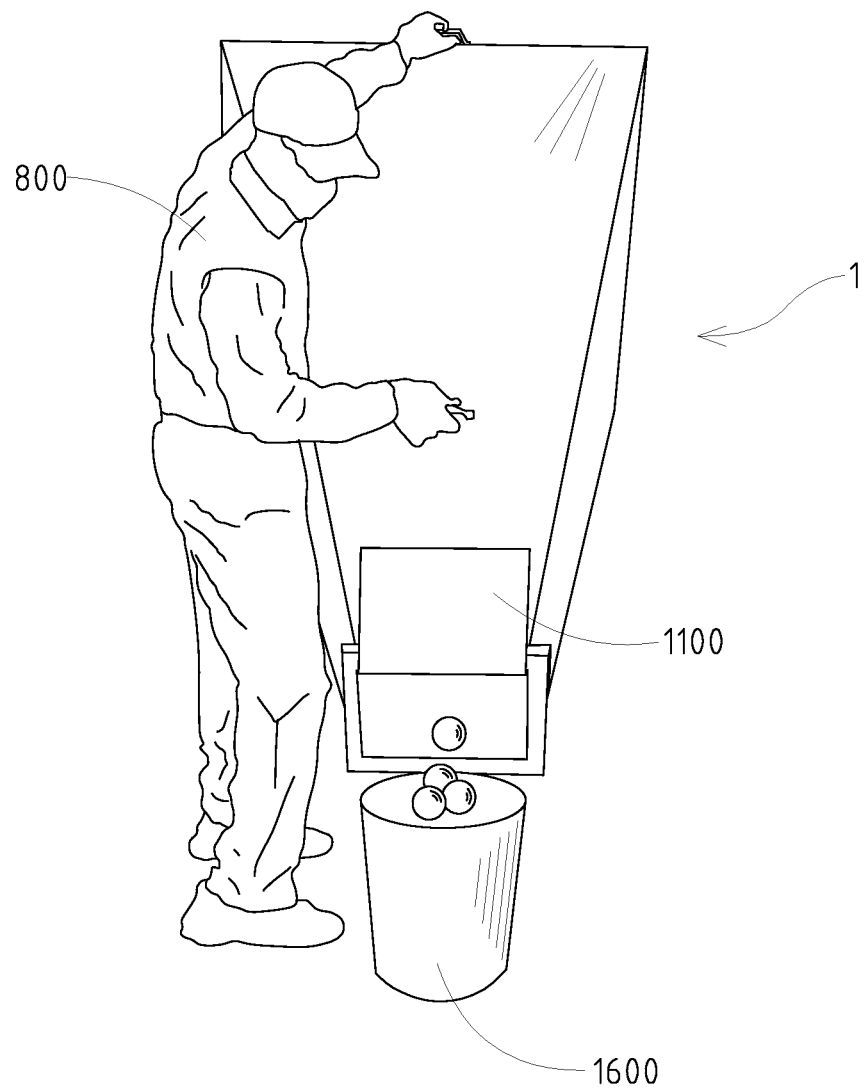
FIG. 16 shows a perspective view of the apparatus being unloaded via the small door into a refuse container.

Unloading via small door—into small container—The small door 1100 may be used to direct the contents of the cavity into a small refuse container 1600 as shown in FIG. 16. Unloading via the small door 1100 is ideally suited when the apparatus 1 is very lightly loaded with debris 600, such as the amount that may be collected from a deck or patio. Also use of the small door 1100 is convenient when the apparatus 1 is lightly loaded with non-compressible objects that would scatter if not immediately unloaded into a container.

Figures and Description of the Third Embodiment

Figures—The description of the third embodiment is illustrated in FIGS. 17A, 17B and 18A-18C.

Figure 17A:
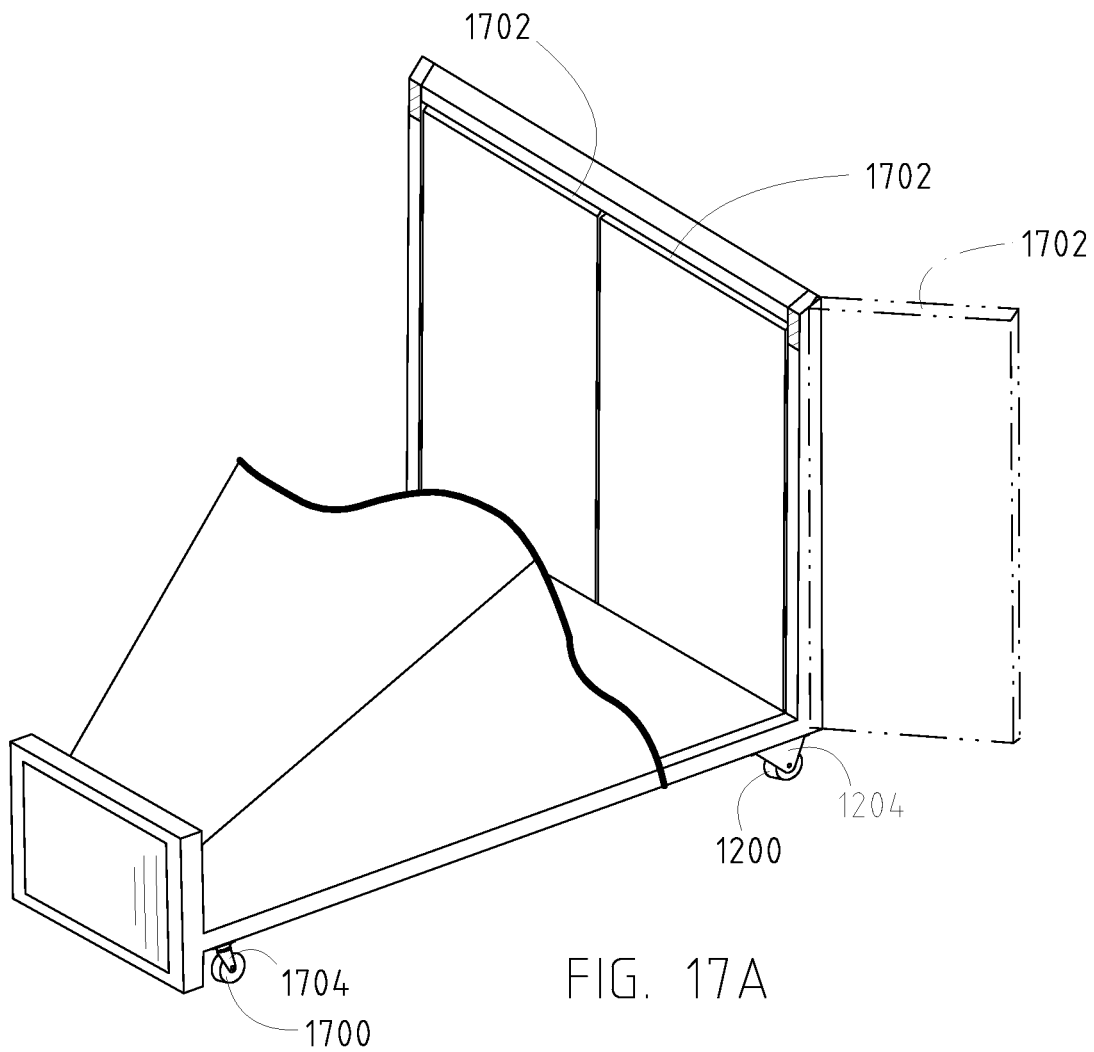
Figure 17B:
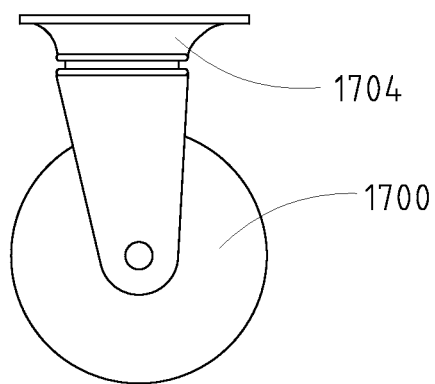

Detailed description of the third embodiment—FIG. 17A shows an embodiment with a the frame 100 mounted on four wheels. The two fixed wheels 1200 from the second embodiment are removed from the large door 114 and mounted to the bottom of the frame 100. A second set of wheels are swivel wheels 1700 and their corresponding swivel wheel brackets 1704 are mounted to the bottom of the frame 100. As opposed to the first and second embodiments where the apparatus 1 rests solely on the rear leg 122 and front legs 120, in this embodiment the apparatus 1 rests on all four wheels at all times. As such the rear leg 122 and front legs 120 are not needed in the third embodiment. The two fixed wheels 1200 and two swivel wheels 1700 provide the worker 800 relief from having to support any weight of the apparatus 1 during transportation. Also the swivel wheels 1700 allow the worker 800 to easily steer the apparatus 1. The rolling transportation means described in the second embodiment along with the swivel wheels 1700 and swivel wheel bracket 1704 provide a swivelable rolling transportation means. Caster-type wheels are shown for both the fixed wheels 1200 and swivel wheels 1700, but larger, softer wheels may be used if turf 1012 damage is a concern or if the apparatus 1 is to roll over extremely rough/uneven surfaces.

FIG. 17 also shows twin doors 1702 that replace the large door 114 described in the first embodiment. The twin doors 1702 may be designed such that they contain extensions or fold-out panel that extend to, or beyond the width of the large door 114 in the first embodiment. The additional width would provide a larger backstop and longer guide to assist collection as described in the operation of the first embodiment. The twin doors 1702 allow the apparatus 1 to operate in a smaller space and allow collection to be equally efficient from both sides of the apparatus 1. Also twin doors 1702 provide an aesthetic appearance which may be desirable to some workers.

FIG. 18 shows the placement of four twin door hinges 1800, two twin door latches 1804, two twin door handles 1802 and twin door material 1806. The twin door material 1806 covers the twin doors 1702 and is made of perforate material. FIG. 18B only shows one twin door handle 1802 and one twin door latch 1804 for clarity, but there are two twin door handles 1802 and two twin door latches 1804, one fitted to each twin door 1702.

Operation of the third embodiment—The operation of the third embodiment is very similar to that of the second embodiment. For this embodiment the twin door panel 1808 on each twin door 1702 is used on the right and left to guide debris 600 into the cavity of the apparatus 1, versus the large door panel 116 in the first embodiment. Once the apparatus 1 is ready to be transported, tilting to roll the apparatus 1 is unnecessary. The worker 800 merely pushes the apparatus 1, using the swivel wheels 1700 to steer in the desired direction. To prepare for unloading, the worker 800 opens both twin doors 1702 to 180°. The worker 800 may stand on either side of the apparatus 1, but may find it convenient to lift one twin door 1702 to plant his or her feet closer to the apparatus 1. Alternatively the twin door handles 1802 may be tied together across the top of the apparatus 1 using a stretch cord, effectively securing them open against the sides of the apparatus 1. Unloading the apparatus 1 is the same as in the previous embodiments.

Figures and Description of the Fourth and Fifth Embodiments

Figure 15B:
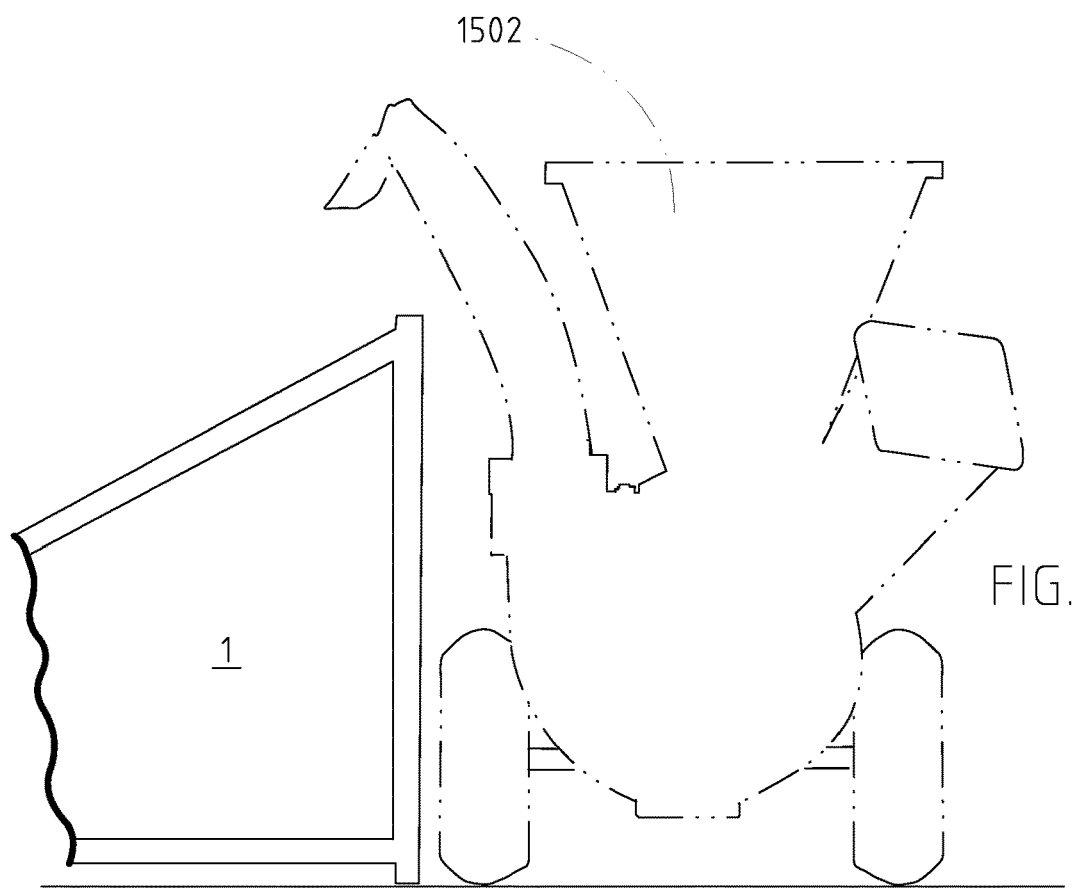
Figure 19A:
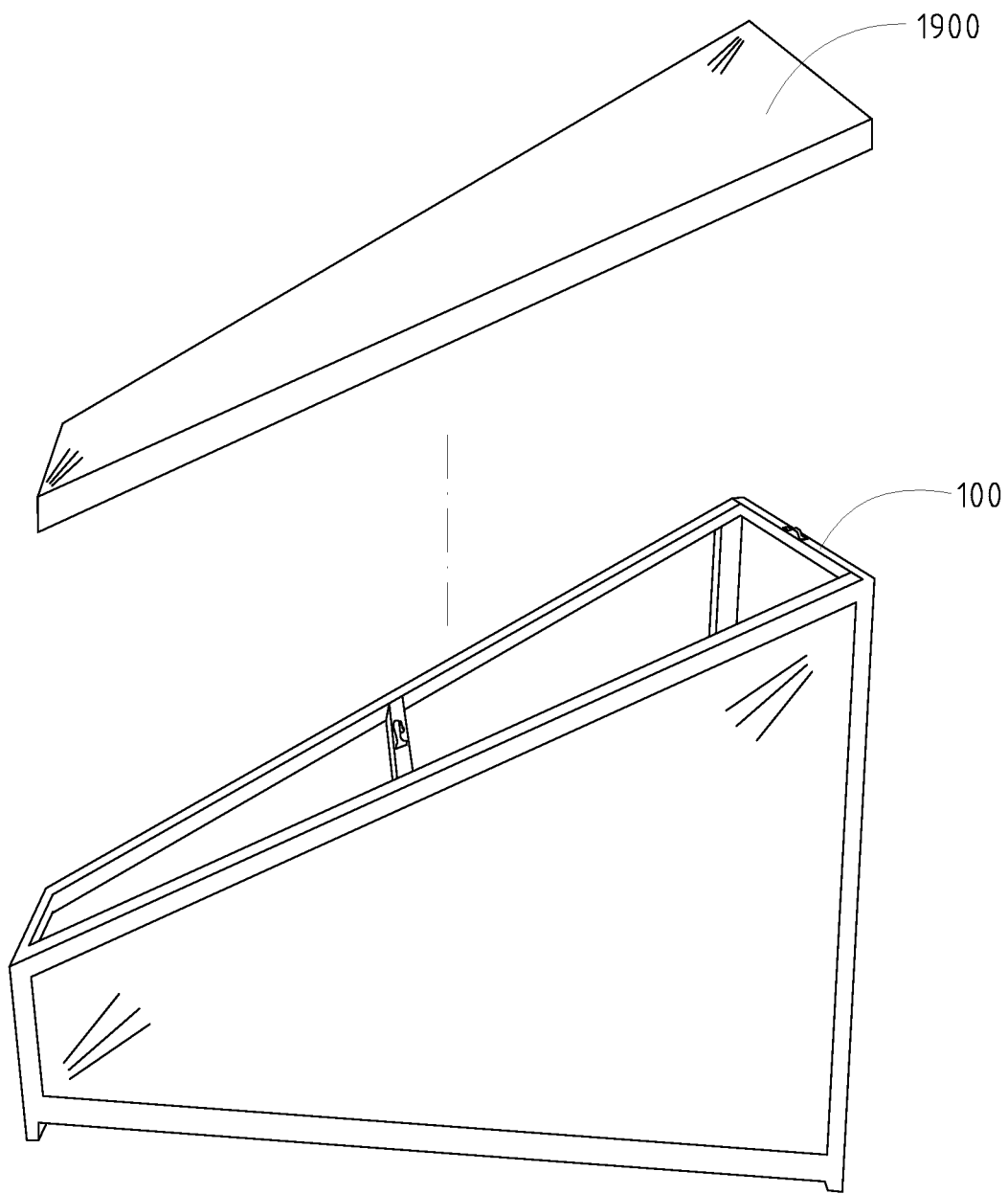
FIGS. 19A and 19B shows views of the apparatus with a base frame, a removable top cover and a removable full cover according to the fourth and fifth embodiments.
Figure 19B:
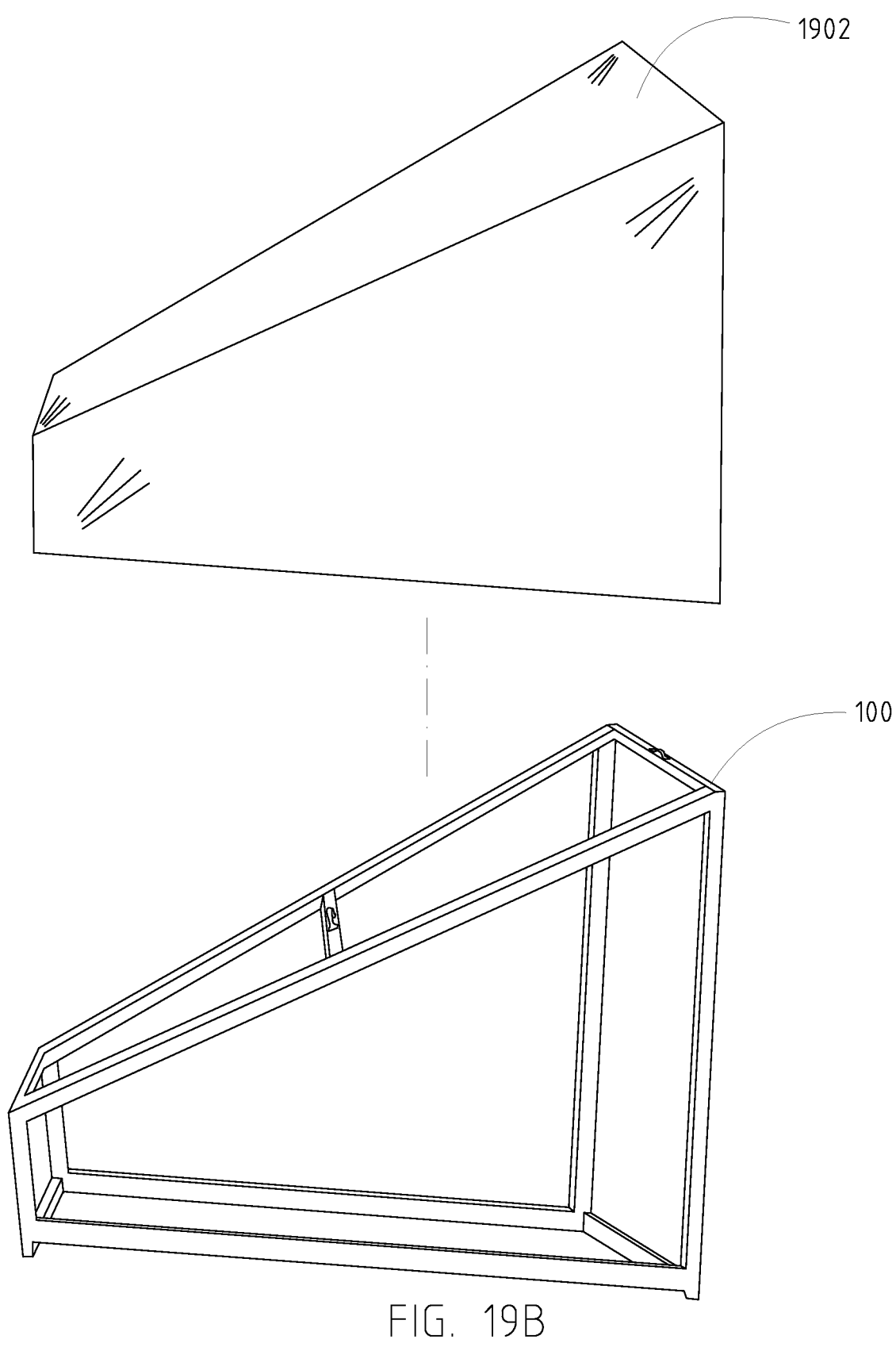

Figures—The descriptions of the fourth and fifth embodiments are illustrated in FIGS. 19A, 15B and 19B. The operation of the fourth and fifth embodiments is illustrated by FIG. 15B.

Detailed description of the fourth and fifth embodiments—FIG. 19A shows an alternate embodiment where a frame 100 is provided with a detachable top cover 1900 that attaches to the frame 100 by hooks, straps, bolts or other type of removable fastener. This allows removal of the top cover 1900 to allow debris 600 falling from above to be collected within the cavity. One potential use for such would be setting the apparatus 1 under a tree for fruit collection or branch pruning. Also a chipper/shredders with a high-discharge output 1502 could direct its output to fall from above into the cavity of the apparatus 1 (see FIG. 15B). The sloping sides allow the apparatus 1 to be moved to accommodate the wide range of discharge heights available from shredder manufacturers.

FIG. 19B shows alternate embodiment where the frame 100 is only covered by the base material 112. The sides and top are covered by a full cover 1902 shown in FIG. 19B. This embodiment allows both the top and sides to be removed and replaced due to wear or damage.

Both full cover 1902 and top cover 1900 could be made of different materials to facilitate the collection of different types of yard or other debris 600. For example a cover with large perforate holes could allow the collection of tree leaves while a cover with smaller holes may be more appropriate for confetti collection.

A further advantage of the fifth embodiment can be achieved by adding the two fixed wheels 1200 and two swivel wheels 1700 as described in the third embodiment. As such with the top cover 1900 removed, the apparatus 1 may function to replace a wheel barrow or lawn cart. The low height of the base material 112 makes it ideal for loading heavy objects, such as bags of potting soil or fertilizer. This would reduce the strain on the worker 800 from having to lift such heavy objects high to put them in, and take them from, a standard wheel barrow or lawn cart.

Operation of the fourth and fifth embodiments—If top cover 1900 is removed and the apparatus 1 is filled from above (see FIG. 15B), refitting the top cover 1900 is not needed for its transport. Although the top cover 1900 is not present the upper top handle 104 and middle top handle 106 are still used as described in earlier embodiments. If the full cover 1902 is removed the apparatus 1 may function as a cart. With the full cover 1902 in place, operation of the apparatus 1 is the same as in the first, second and third embodiments.

Embodiment Advantages—From the embodiment descriptions above, a number of advantages of some embodiments described become evident:
 (a) protection from re-scattering collected leaves unintentionally by the worker or by nature
 (b) eliminates need to have single-use bags on hand
 (c) eliminates need to keep up with numerous small parts during leaf maintenance (d) ability to collect leaves and small debris over grassy and hard surfaces
 (e) reduced effort required to transport and unload collected debris and dense shredded material
 (f) apparatus may be constructed from lightweight, inexpensive materials
 (g) loaded capacity of a half cubic yard can be managed easily by one person
 (h) apparatus may be used as a utility/garden cart, thereby saving the homeowner cost of purchasing such equipment and saving the storage space thereof
 (i) apparatus may be constructed such that wear/damaged elements are replaceable
 (j) facilitates gathering and collection methods that save time and effort Methods Advantages—From the operational descriptions above, a number of advantages of the methods described become evident:
 (a) ability to start and stop gathering/collection anywhere—not limited to starting at the farthest point away
 (b) no large pile left on the collection area in the event of sudden onset of inclement weather or nightfall
 (c) allows effective use of both low and high powered leaf blowers (d) minimizes duration of blower use saving battery-life/fuel, wear/tear, noise pollution and worker fatigue (e) reduces stress on the lawn due to excess foot traffic and excess air stream impact Conclusion, Ramifications and Scope—The reader can see that at least one embodiment of the apparatus provides many advantages to make the task of leaf collection faster, easier and less frustrating. Furthermore the apparatus can also be used in place of wheel barrow or lawn/garden cart, saving the need to purchase and store such items.

The above description included some variations of the embodiments, but others are possible. For example: The prior embodiments describe an apparatus of size and weight that could be easily handled by one person. Lawn maintenance professionals may place a higher premium on volumetric capacity than on size and weight, so a much larger apparatus may be constructed. Also a larger apparatus may be fitted with a off-road or on-road tow-bar to accommodate its increased weight and size. Accordingly a apparatus may be fitted with an assist mechanism to push or dump its contents off the end, or to the side. Also separate devices dedicated for leaf collection and shredder capture may be desirable.

The woven material for the large door, sides and the base described previously were all woven fabric, but a more durable material, such as mesh or expanded metal may be used. Also, the mesh size could be selected according to the debris desired for collection. The base can be made of a durable non-porous material such as sheet metal or vinyl for added durability. An apparatus could be designed to be easily disassembled or collapsible so that it would take up less storage space in the off-season.

I claim:

1. An apparatus for collecting solid objects of a predetermined size which are randomly dispersed along a planar surface comprising:
an enclosed rigid container comprising:
(a) a plurality of panels;
(b) a base panel having a right edge, left edge, front edge and rear edge with said base panel rear edge opposite said base panel front edge and said base panel right edge opposite said base panel left edge;
(c) a top panel having a right edge, left edge, front edge and rear edge with said top panel rear edge opposite said top panel front edge and said top panel right edge opposite said top panel left edge;
(d) a left panel having an upper edge, lower edge, front edge and rear edge with said left panel rear edge opposite said left panel front edge and said left panel upper edge opposite said left panel lower edge;
(e) a right panel having an upper edge, lower edge, front edge and rear edge with said right panel rear edge opposite said right panel front edge and said right panel upper edge opposite said right panel right lower edge;
(f) a front panel having an upper edge, lower edge, right edge and left edge with said front panel upper edge opposite said front panel lower edge and said front panel right edge opposite said panel left edge;
(g) a rear panel having an upper edge, lower edge, right edge and left edge with said rear panel upper edge opposite said rear panel lower edge and said rear panel right edge opposite said rear panel left edge;
(h) at least one leg having a predetermined length;
wherein said legs provide clearance between said planar surface and said base panel thereby allowing a directed air stream to convey said solid objects from under said base panel and entire length of said left panel upper edge is fixedly attached to entire length of said top panel left edge and entire length of said left panel lower edge fixedly attached to entire length of said base panel left edge and entire length of said left panel front edge fixedly attached to entire length of said front panel left edge and entire length of said left panel rear edge fixedly attached to entire length of said rear panel left edge and entire length of said right panel upper edge fixedly attached to entire length of said top panel right edge and entire length of said right panel lower edge fixedly attached to entire length of said base panel right edge and entire length of said right panel front edge fixedly attached to entire length of said front panel right edge and entire length of said right panel rear edge fixedly attached to entire length of said rear panel right edge and entire length of said front panel upper edge fixedly attached to entire length of said top panel front edge and entire length of said front panel lower edge fixedly attached to entire length of said base panel front edge and entire length of said rear panel upper edge fixedly attached to entire length of said top panel rear edge and entire length of said rear panel lower edge fixedly attached to entire length of said base panel rear edge and said base panel fixedly attached to said legs and said top panel is essentially composed of top perforate material and a front aperture fluidly connecting the inside to outside of said container vertically hingedly attached is disposed in said front panel and said front aperture is essentially composed of front perforate material and said container rests on said legs and said base panel is essentially parallel with said planar surface;

further wherein said front aperture hinges allow said front aperture to be positioned in a range of 0° to 240° with respect to the plane of said front panel;

further wherein when said front aperture is set to an angle of 0° said container is closed;

further wherein when said front aperture is set to an angle of 240° and said front aperture is set against a vertical barrier and said solid objects are conveyed by said directed air stream toward said container said solid objects hitting said vertical barrier are reflected off said vertical barrier and into said container;

further wherein when said front aperture is set to an angle of 180° and and said solid objects are conveyed by said directed air stream directly toward said front aperture said solid objects hitting said front aperture are trapped against said front aperture while said directed air stream pass through said front aperture perforate material thereby resulting in said solid objects falling to said planar surface by gravity;

further wherein when said front aperture is set to an angle of 180° and and said solid objects are conveyed by said directed air stream toward said container axially to said front aperture said solid objects are conveyed mesial said right panel and said left panel and proximate the opening of said container;

further wherein when said front aperture is set to an angle of 90° and said solid objects are conveyed by said directed air stream axially to said front aperture and toward said container said objects are conveyed across the threshold of said front aperture and into said container;

further wherein when said front aperture is open and said solid objects are conveyed by said directed air stream across said planar surface, over threshold of said front aperture and into said container and said directed air stream passes through said top perforate material and exits said container while said top perforate material blocks exit of said solid objects of a predetermined size thereby causing said solid objects to lose animation and settle, collected on said base panel of said container.

2. The apparatus of claim 1 further comprising:
(a) a plurality of latching means;
(b) a plurality of handles;
(c) at least one cross brace;
(d) at least one auxiliary aperture fluidly connecting the inside to outside of said container;

wherein said front aperture has at least one said latching means and said auxiliary aperture having at least one said latching means and at least one said handle is deposed in said front aperture and at least one said handle is deposed in said top panel and at least one said handle is disposed on said auxiliary aperture and at least one said cross brace is deposed in said top panel and said cross brace is removably attached to said right panel and said cross brace is removably attached to said left panel and said auxiliary aperture having a predetermined size is hingedly attached and disposed in at least one said panel.

3. The apparatus of claim 2 further having a rolling transportation means fixedly attached to at least one said panel for essentially eliminating sliding friction between said container and a resting surface of said container when said container is tilted and urged along said resting surface for the purpose of relocation of said container.

4. The apparatus of claim 2 wherein said auxiliary aperture is disposed in said rear panel and said auxiliary aperture having at least one auxiliary aperture hinge and said auxiliary aperture hinge allows said auxiliary aperture to be positioned in the range of 0° to 240° with respect to the plane of said rear panel wherein when said auxiliary aperture is positioned at 0° said auxiliary aperture is closed and wherein when said auxiliary aperture is positioned in the range greater than 0° and said auxiliary aperture is positioned in the range less than 180° said auxiliary aperture is partially open and further wherein when said auxiliary aperture is partially open and said apparatus is tilted with said auxiliary aperture pointing downward to empty said container said auxiliary aperture restricts the flow of said solid objects leaving said container thereby allowing precise disposal of said solid objects.

5. The apparatus of claim 2 where said front aperture is comprised of a left front aperture and a right front aperture wherein said left front aperture having essentially an identical size as said right front aperture and said left front aperture is vertically hingedly attached to said front panel and said right front aperture is vertically hingedly attached to said front panel and and said left front aperture hinges allow said left front aperture to be positioned in the range of 0° to negative 2400 with respect to the plane of said front panel further wherein when said left front aperture is set to an angle of 0° and said right front aperture is set to an angle of 0° said container is closed further wherein when said left front aperture is set to an angle of minus 240° and said left front aperture is set against a vertical barrier and said solid objects are conveyed by said directed air stream toward said container said solid objects hitting said vertical barrier are reflected off said vertical barrier and into said container further wherein when said left front aperture is set to an angle of minus 180° and and said solid objects are conveyed by said directed air stream directly toward said left front aperture said solid objects hitting said left front aperture are trapped against said left front aperture while said directed air stream pass through said left front aperture perforate material thereby resulting in said solid objects falling to said planar surface by gravity further wherein when said left front aperture is set to an angle of minus 90° and said solid objects are conveyed by said directed air stream axially to said left front aperture and toward said container said objects are conveyed across said threshold of said left front aperture and into said container.

6. An apparatus for collecting solid objects of a predetermined size which are randomly dispersed along a planar surface comprising:

an enclosed rigid container comprising:
(a) a plurality of panels:
(b) a base panel having a right edge, left edge, front edge and rear edge with said base panel rear edge opposite said base panel front edge and said base panel right edge opposite said base panel left edge:
(c) a top panel having a right edge, left edge, front edge and rear edge with said top panel rear edge opposite said top panel front edge and said top panel right edge opposite said top panel left edge;
(d) a left panel having a upper edge, lower edge, front edge and rear edge with said left panel rear edge opposite said left panel front edge and said left panel upper edge opposite said left panel lower edge;
(e) a right panel having a upper edge, lower edge, front edge and rear edge with said right panel rear edge opposite said right panel front edge and said right panel upper edge opposite said right panel right lower edge;

(f) a front panel having an upper edge, lower edge, right edge and left edge with said front panel upper edge opposite said front panel lower edge and said front panel right edge opposite said panel left edge;

(g) a rear panel having an upper edge, lower edge, right edge and left edge with said rear panel upper edge opposite said rear panel lower edge and said rear panel right edge opposite said rear panel left edge;

(h) at least one leg having a predetermined length;

(i) a plurality of long, slender rigid members fastened together forming an open base frame and (j) a flexible base material covering and attached to said open base frame and further having a load-assist means comprising:
(a) a base extension to said flexible base material, said base extension having a left side base extension, a right side base extension, a rear side base extension and a front side base extension, said right side base extension having a predetermined length and said left side base extension having a predetermined length, said rear side base extension attached to said base panel front edge and a plurality of base extension sleeves sewn into periphery of said base extension and
(b) at least one weighted rod disposed into said base extension sleeve;

wherein entire length of said left panel upper edge is fixedly attached to entire length of said top panel left edge and entire length of said left panel lower edge fixedly attached to entire length of said base panel left edge and entire length of said left panel front edge fixedly attached to entire length of said front panel left edge and entire length of said left panel rear edge fixed attached to entire length of said rear panel left edge and entire length of said right panel upper edge fixedly attached to entire length of said top panel right edge and entire length of said right panel lower edge fixedly attached to entire length of said base panel right edge and entire length of said right panel front edge fixedly attached to entire length of said front panel right edge and entire length of said right panel rear edge fixed attached to entire length of said rear panel right edge and entire length of said front panel upper edge fixedly attached to entire length of said top panel front edge and entire length of said front panel lower edge fixedly attached to entire length of said base panel front edge and entire length of said rear panel upper edge fixedly attached to entire length of said top panel rear edge and entire length of said rear panel lower edge fixedly attached to entire length of said base panel rear edge and said base panel fixedly attached to said legs and said top panel is essentially composed of top perforate material and a front aperture fluidly connecting the inside to outside of said container vertically hingedly attached is disposed in said front panel and said front aperture is essentially composed of front perforate material and said container rests on said legs and said base panel is essentially parallel with said planar surface;

further wherein when said front aperture is open and said solid objects are conveyed by a directed air stream across said planar surface, over threshold of said aperture and into said container and said directed air stream passes through said top perforate material and exits said container while said top perforate material blocks exit of said solid objects of a predetermined size thereby causing said solid objects to lose animation and settle, collected on said base panel of said container further wherein when said solid objects are conveyed by said directed air stream across said planar surface, said base extension aids in collection of said solid object by allowing said solid objects that are airborne to be disposed on said base extension and by allowing said base extension to hold fast to said planar surface whereon placed whereby said solid object are more easily conveyed into said container.

7. The apparatus of claim 6 further having a rolling transportation means fixedly attached to at least one said panel for essentially eliminating sliding friction between said container and a resting surface of said container when said container is tilted and urged along said resting surface for the purpose of relocation of said container.

8. The apparatus of claim 7 having a rear aperture fluidly connecting the inside to outside of said container hingedly attached and disposed in said rear panel.

9. The apparatus of claim 7 where said front aperture is comprised of two equally-sized, vertical, hingedly attached opposing members and further having a swivelable rolling transportation means fixedly attached to at least one said panel for essentially eliminating sliding friction between said container and said resting surface of said container when said container is urged along said resting surface for the purpose of relocation of said container.

10. The apparatus of claim 9 where said where said top panel is removably attached.

11. The apparatus of claim 10 where said where said left panel is removable and said right panel is removably attached.

12. A method for collecting small objects randomly dispersed across a planar surface using the apparatus of claim 6 comprising:

(a) providing a closed container having at least one planar aperture made essentially of perforate material, said aperture fluidly connecting the inside and outside of said container;

(b) providing an aperture frame surrounding said aperture;

(c) providing at least one vertically mounted hinge attaching said aperture to said aperture frame;

(d) providing an air stream generation means;

(e) providing an essentially planar surface at least twice as wide as said container;

(f) providing an essentially planar surface at least twice as long as said container is in depth;

(g) providing said planar surface with randomly dispersed small objects along the surface of said planar surface and (h) placing said container on said planar surface such that width of said container aligns with width of said planar surface and said container aperture can be opened to 180° with respect to said aperture frame and said aperture remains within the confines of said planar surface and (i) opening said aperture to 180° with respect to said aperture frame and
(j) directing an air stream to blow said small objects perpendicularly against the inside surface of said aperture and
(k) directing said air stream to blow said small objects axially along the bottom of said inside surface of said aperture toward said aperture opening and
(l) opening said aperture to 90° with respect to said aperture frame and
(m) directing said air stream to blow said small objects perpendicularly against said inside surface of said aperture and
(n) directing said air stream to blow said small objects axially along said bottom of said inside surface of said aperture through said aperture opening and
(o) directing said air stream to blow any remaining said small objects perpendicularly against the inside surface of said aperture and
(p) directing said air stream to blow said remaining small objects axially along said bottom of said inside surface of said aperture and through said aperture opening
wherein said small objects and said air stream are blown perpendicularly against said aperture, said air stream passes through said perforate material, but said small objects are blocked, fall by gravity and accumulate at the bottom of said aperture and said small objects are guided into said container by said air stream and said small objects are blocked by said aperture from re-entering cleared areas thereby providing efficient clearing of said planar surface of said small objects and minimizing excess movement of said small objects.

13. A method for gathering small objects randomly dispersed across a planar surface using the apparatus of claim 6 comprising:
   (a) providing a container with a predetermined volume for housing said small objects and;
   (b) providing said planar surface with at least said predetermined volume of said small objects;
   (c) providing an air stream generating means and
   (d) using said air stream generating means to clear a portion of said planar surface of said small objects and
   (e) only gathering an amount of said small objects essentially equal to said predetermined volume and
   (f) immediately conveying said amount of said small objects into said container
   (g) wherein gathering of said individual small objects essentially only occurs once
   (h) thereby minimizing re-dispersion of previously gathered said small objects into uncleared portions of said planar surface for the purpose of subsequent clearings
   (i) thereby reducing rework, making said gathering more efficient.

14. The apparatus of claim 8 where said front aperture is comprised of two equally-sized, vertical, hingedly attached opposing members.

15. The apparatus of claim 14, where said where said top panel is removably attached.

16. The apparatus of claim 15 where said where said left panel is removable and said right panel is removably attached.

17. The apparatus of claim 16 further having at least one top brace fixedly connecting said top panel left edge to said top panel right edge and an upper top handle disposed essentially at said top panel front edge and a middle top handle fixedly attached to said top brace and said left side panel is essentially composed of woven material and said right panel is essentially composed of woven material and said flexible base material is canvas and said base extension is composed of canvas and at least one bottom cross brace fixedly connecting said base panel left edge to said base panel right edge and said front aperture having a latching means and said front aperture having at least one front aperture handle and a first short weighted rod is disposed in said base extension sleeve and a second short weighted rod disposed in said base extension sleeve and said rear aperture having said latching means and said rear aperture having a rear aperture handle and said base extension further having a stowable means and further having a swivelable rolling transportation means.

* * * * *